(12) United States Patent
Liu

(10) Patent No.: US 9,704,625 B2
(45) Date of Patent: Jul. 11, 2017

(54) MAGNETIC NANOPARTICLES, BULK NANOCOMPOSITE MAGNETS, AND PRODUCTION THEREOF

(71) Applicant: Board of Regents, The University of Texas System, Austin, TX (US)

(72) Inventor: J. Ping Liu, Arlington, TX (US)

(73) Assignee: BOARD OF REGENTS, THE UNIVERSITY OF TEXAS SYSTEM, Austin, TX (US)

(*) Notice: Subject to any disclaimer, the term of this patent is extended or adjusted under 35 U.S.C. 154(b) by 158 days.

(21) Appl. No.: 14/315,677

(22) Filed: Jun. 26, 2014

(65) Prior Publication Data

US 2014/0345424 A1    Nov. 27, 2014

Related U.S. Application Data

(62) Division of application No. 12/341,656, filed on Dec. 22, 2008, now abandoned.

(Continued)

(51) Int. Cl.

| | |
|---|---|
| *H01F 1/03* | (2006.01) |
| *B22F 1/00* | (2006.01) |
| *B22F 9/04* | (2006.01) |
| *B82Y 25/00* | (2011.01) |
| *B82Y 30/00* | (2011.01) |
| *H01F 1/057* | (2006.01) |
| *H01F 41/02* | (2006.01) |
| *H01F 10/12* | (2006.01) |

(Continued)

(52) U.S. Cl.
CPC ............ *H01F 1/03* (2013.01); *B22F 1/0018* (2013.01); *B22F 1/0025* (2013.01); *B22F 9/04* (2013.01); *B29B 9/12* (2013.01); *B82Y 25/00* (2013.01); *B82Y 30/00* (2013.01); *H01F 1/0009* (2013.01); *H01F 1/0579* (2013.01); *H01F 10/123* (2013.01); *H01F 41/00* (2013.01); *H01F 41/0266* (2013.01); *B22F 2009/041* (2013.01); *B22F 2009/043* (2013.01); *B29B 2009/125* (2013.01); *C22C 2202/02* (2013.01)

(58) Field of Classification Search
CPC .................................. H01F 1/03; B22F 1/0018
USPC ........................................................ 148/102
See application file for complete search history.

(56) References Cited

U.S. PATENT DOCUMENTS

| | | |
|---|---|---|
| 3,215,572 A | 11/1965 | Papell |
| 3,917,538 A | 11/1975 | Rosensweig |

(Continued)

FOREIGN PATENT DOCUMENTS

| | | |
|---|---|---|
| JP | 1029428 | 11/1998 |
| JP | 2005298857 | 10/2005 |

(Continued)

OTHER PUBLICATIONS

Wang et al. ("Sm—Co hard magnetic nanoparticles prepared by surfactant-assisted ball milling", Nanotechnology 18 (2007) 465701 (4pp)) (Listed as No. 49 NPL in the IDS filed by the applicant on Dec. 7, 2015).*

(Continued)

*Primary Examiner* — Weiping Zhu
(74) *Attorney, Agent, or Firm* — John P. Zimmer; Smith Moore Leatherwood LLP

(57) ABSTRACT

Provided herein are systems, methods, and compositions for magnetic nanoparticles and bulk nanocomposite magnets.

9 Claims, 24 Drawing Sheets

Related U.S. Application Data

(60) Provisional application No. 61/016,353, filed on Dec. 21, 2007.

(51) Int. Cl.
*B29B 9/12* (2006.01)
*H01F 41/00* (2006.01)
*H01F 1/00* (2006.01)

(56) References Cited

U.S. PATENT DOCUMENTS

| | | | |
|---|---|---|---|
| 5,145,684 | A | 9/1992 | Liversidge et al. |
| 5,147,573 | A | 9/1992 | Chagnon |
| 5,510,118 | A | 4/1996 | Bosch et al. |
| 6,401,799 | B1 | 6/2002 | Arai et al. |
| 6,425,961 | B1 | 7/2002 | Kojima et al. |
| 6,752,979 | B1 | 6/2004 | Talbot et al. |
| 6,972,046 | B2 | 12/2005 | Sun et al. |
| 6,979,374 | B2 | 12/2005 | Arai et al. |
| 7,144,463 | B2 | 12/2006 | Chen et al. |
| 2002/0003179 | A1 | 1/2002 | Verhoff et al. |
| 2002/0039594 | A1 | 4/2002 | Unger |
| 2002/0179185 | A1 | 12/2002 | Billiet et al. |
| 2007/0036026 | A1 | 2/2007 | Laibinis et al. |
| 2008/0260941 | A1 | 10/2008 | Jin |
| 2010/0054981 | A1 | 3/2010 | Liu |
| 2012/0153212 | A1 | 6/2012 | Liu |

FOREIGN PATENT DOCUMENTS

| | | |
|---|---|---|
| WO | 2006113354 | 10/2006 |
| WO | 2007069262 | 6/2007 |

OTHER PUBLICATIONS

U.S. Appl. No. 12/341,656, "Non-Final Office Action", Mar. 11, 2014, 9 pages.
U.S. Appl. No. 12/341,656, "Office Action", Sep. 2, 2011, 8 pages.
U.S. Appl. No. 12/968,999, "Advisory Action", Aug. 31, 2015, 3 pages.
U.S. Appl. No. 12/968,999, "Final Office Action", Feb. 20, 2015, 12 pages.
U.S. Appl. No. 12/968,999, "Final Office Action", Aug. 21, 2013, 9 pages.
U.S. Appl. No. 12/968,999, "Non-Final Office Action", Jul. 17, 2014, 10 pages.
U.S. Appl. No. 12/968,999, "Non-Final Office Action", Oct. 2, 2015, 9 pages.
U.S. Appl. No. 12/968,999, "Notice of Allowance", Nov. 10, 2015, 7 pages.
U.S. Appl. No. 12/968,999, "Office Action", Feb. 7, 2013, 9 Pages.
Chen et al., "Bulk nanocomposite magnets produced by dynamic shock compaction", Journal of Applied Physics, 2004, 96: 1276-1278.
Choi et al., "Element-specific recoil loops in Sm—Co/Fe exchange-spring magnets", J. Appl. Phys., 2008, 103:07E132-1-07E132-3.
Elkins et al., "A novel approach to synthesis of FePt magnetic nanoparticles", Journal of Nano Research, 2008, 1: 23-29.
Elkins et al., "Monodisperse face-centred tetragonal FePt nanoparticles with giant coercivity", Journal of Physics D: Applied Physics, 2005, 38: 2306-2309.
Elkins et al., "Ultrafine FePt nanoparticles prepared by the chemical reduction method", Nano Letters, 2003, 3:12: 1647-1649.
Guo et al., "Exchange-coupled Sm—Co/Nd—Co nanomagnets: correlation between soft phase anisotropy and exchange field", Applied Physics Letters, vol. 81(11), Sep. 2002, pp. 2029-2031.
Gutfleisch, "Preparation Methods for Bulk Materials", European School on Magnetism: New Experimental Approaches in Magnetism, Constanta, 2005, pp. 1-7.
Hou et al., "A facile synthesis of SmCo5 magnets for core/shell Co/Sm2O3 nanoparticles", Advanced Materials, 2007, 19: 3349-3352.
Nandwana et al., "Size and shape control of monodisperse FePt nanoparticles", J. Phys. Chem. C., 2007, 111: 4185-4189.
Qu et al., "Densification mechanism of warm compaction for iron-based powder materials", Material Science Forum, 2007, 534-536: 261-264.
Rong et al., "Bulk FePt-based nanocomposite magnets with enhanced exchange coupling", J. Applied Physics, 2007, 102: 023908-1-023908-7.
Rong et al., "High-thermal stability of carbon-coated L10-FePt nanoparticles prepared by salt-matrix annealing", J. Appl. Phys., 2008, 103: 07E131-1-07E131-3.
Rong et al., "Size-dependent chemical and magnetic ordering in L10 FePt nanoparticles", Advanced Materials, 2006, 18: 2984-2988.
Shan et al., "Energy Barrier and Magnetic Properties of Exchange-Coupled Hard-Soft Bilayer", IEEE Transactions on Magnetics, 2002, 38(5): 2907-2909.
Shokrollahi et al., "Effect fo warm compaction on the magnetic and electrical properties of Fe-based soft magnetic composits", Journal of Magnetism and Magnetic Materials, 2007, 313:1: 182-186.
Sun, "Recent Advances in Chemical Synthesis, Self-Assembly, and Applications of FePt Nanoparticles", Advanced Materials, vol. 18, Issue 4, Feb. 2006, pp. 393-403.
Swygenhoven et al., "Deformation in Nanocrystalline Metals", Materials Today, vol. 9, Issue 5, May 2006, pp. 24-31.
Wang et al., "Sm—Co hard magnetic nanoparticles prepared by surfactant-assisted ball milling", Nanotechnology, 2007, 18:465701: 1-4.
Wei et al., "Crystal structure and compressibility of FePt nanoparticles under high pressures and high temperatures", High Pressure Research, 2004, 24:3: 357-364.
Yano et al., "Rapid Thermal Annealing of FePt Aanoparticles", Journal of Applied Physics, vol. 104, Jul. 2008, p. 013918.
Zeng et al., "Tailoring Magnetic Properties of Core/Shell Nanoparticles", Applied Physics Letters, vol. 85(5), Sep. 2004, pp. 792-794.

\* cited by examiner

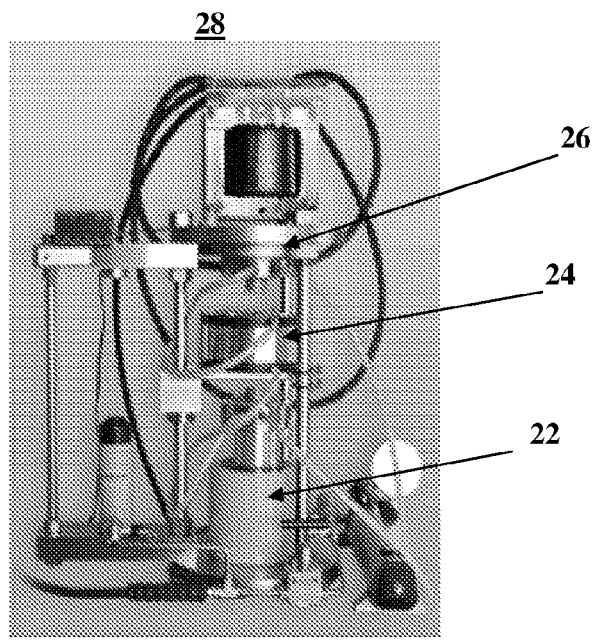
FIG. 2B
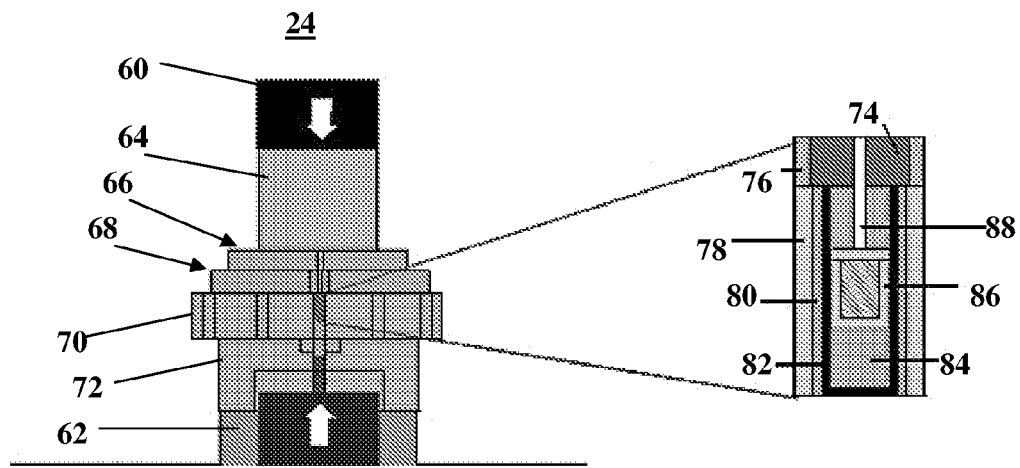
FIG. 2C
FIG. 2D

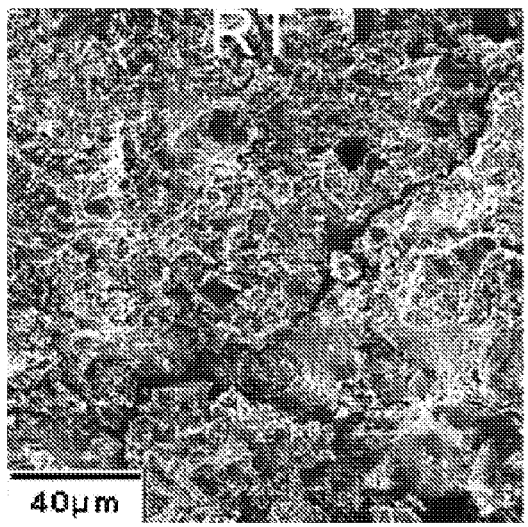
FIG. 13A
FIG. 13B
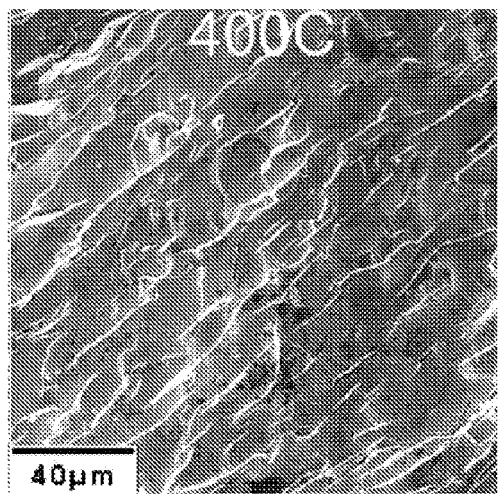
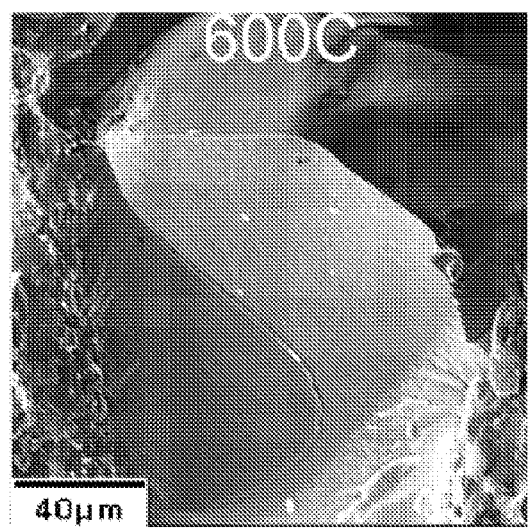
FIG. 13C

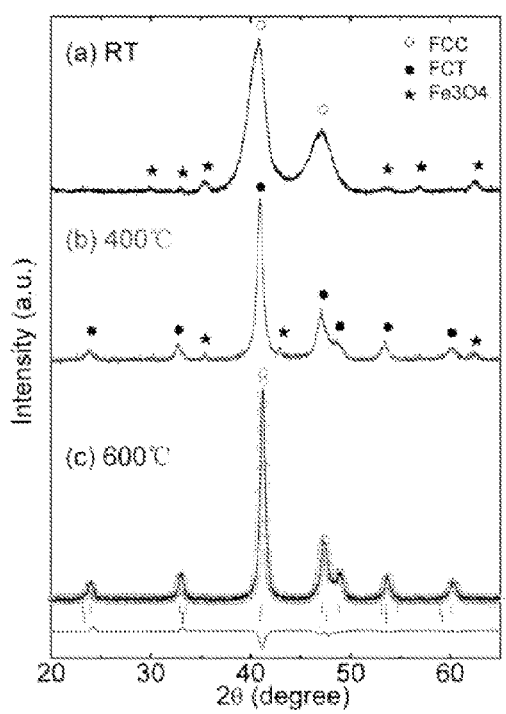
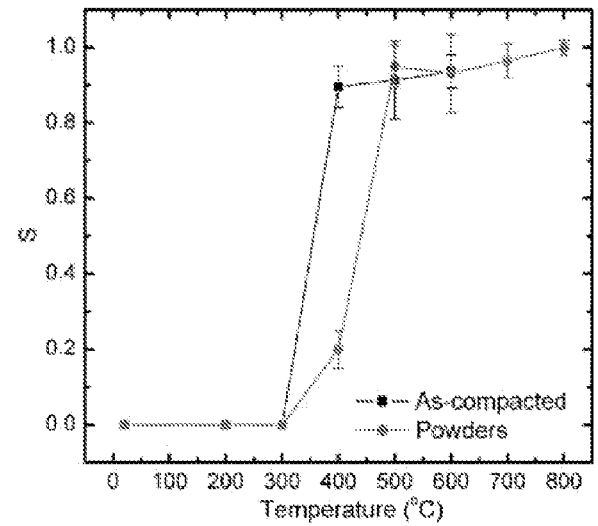
FIG. 14
FIG. 15
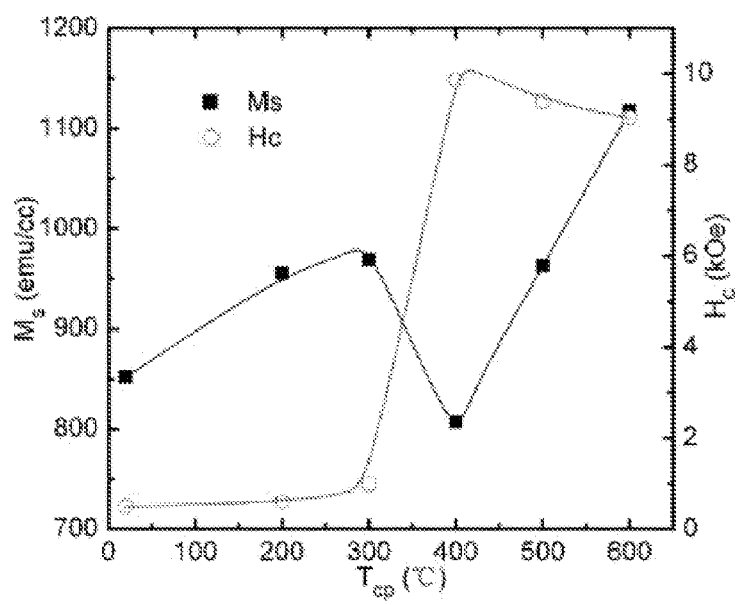
FIG. 16

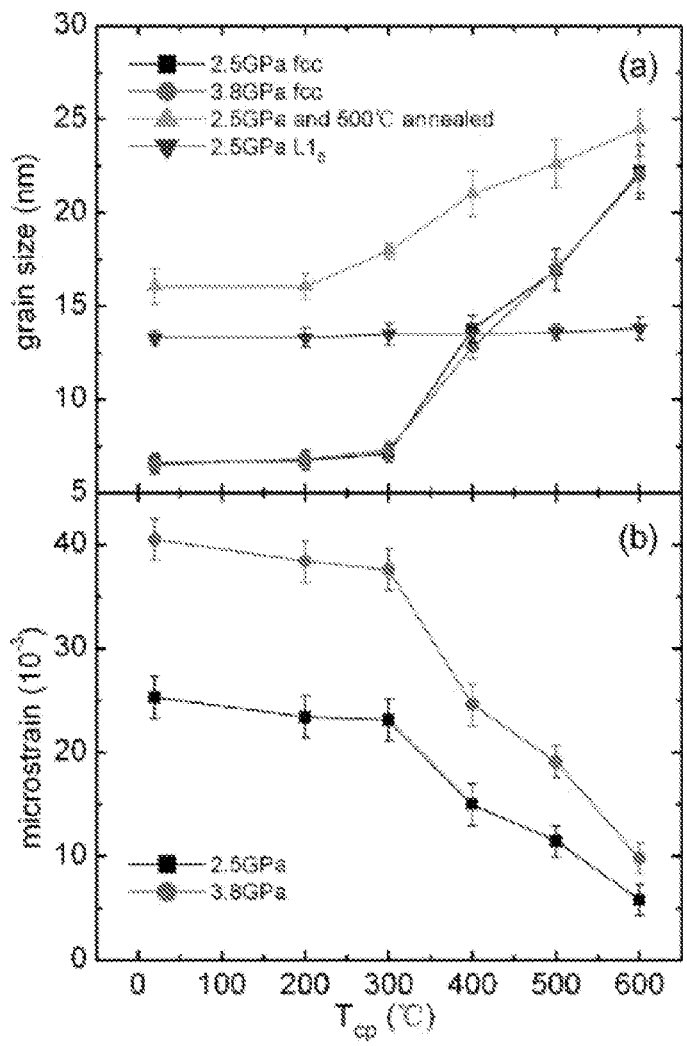
FIG. 17A
FIG. 17B
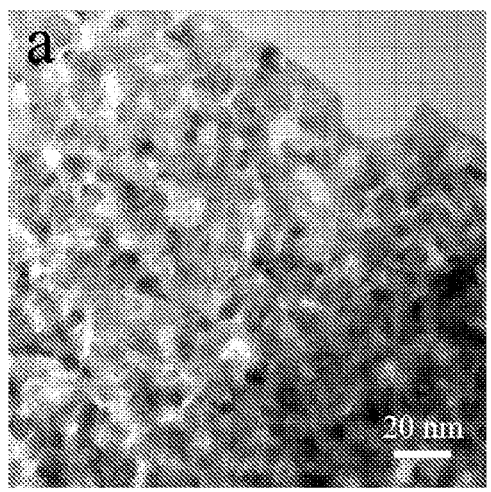 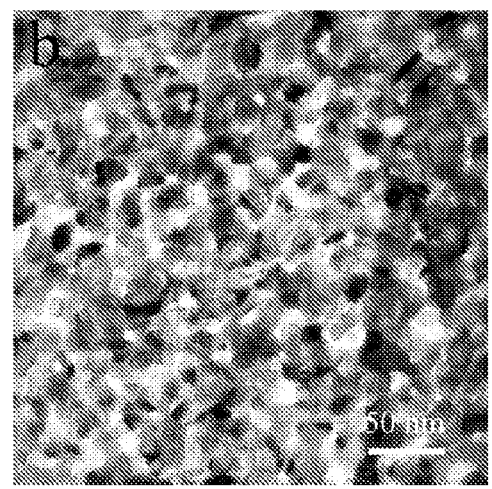
FIG. 18A					FIG. 18B

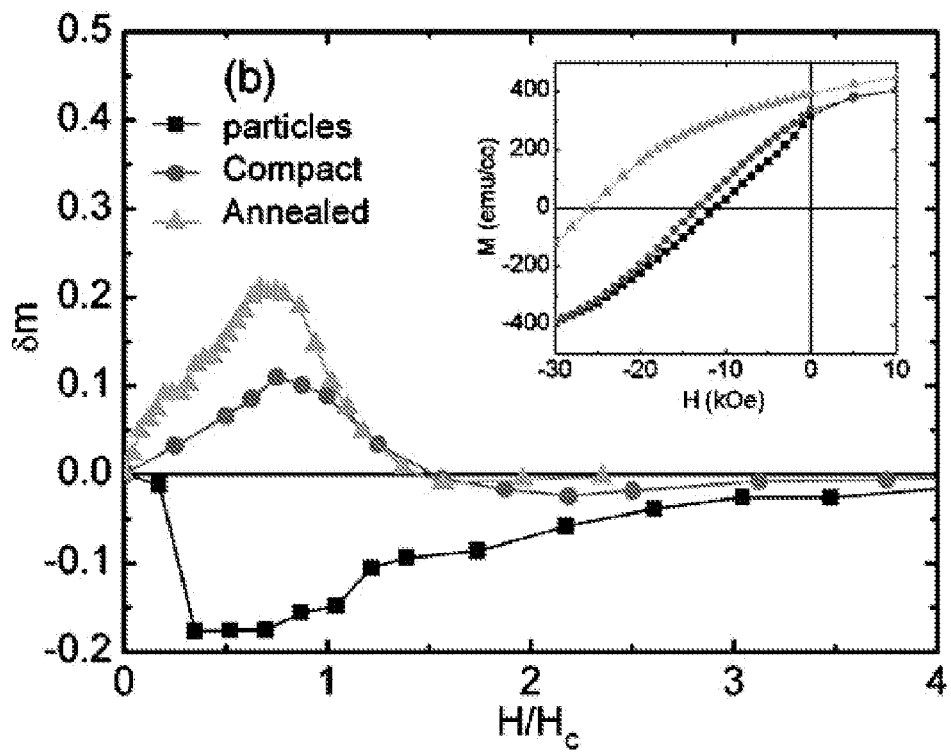
FIG. 19B
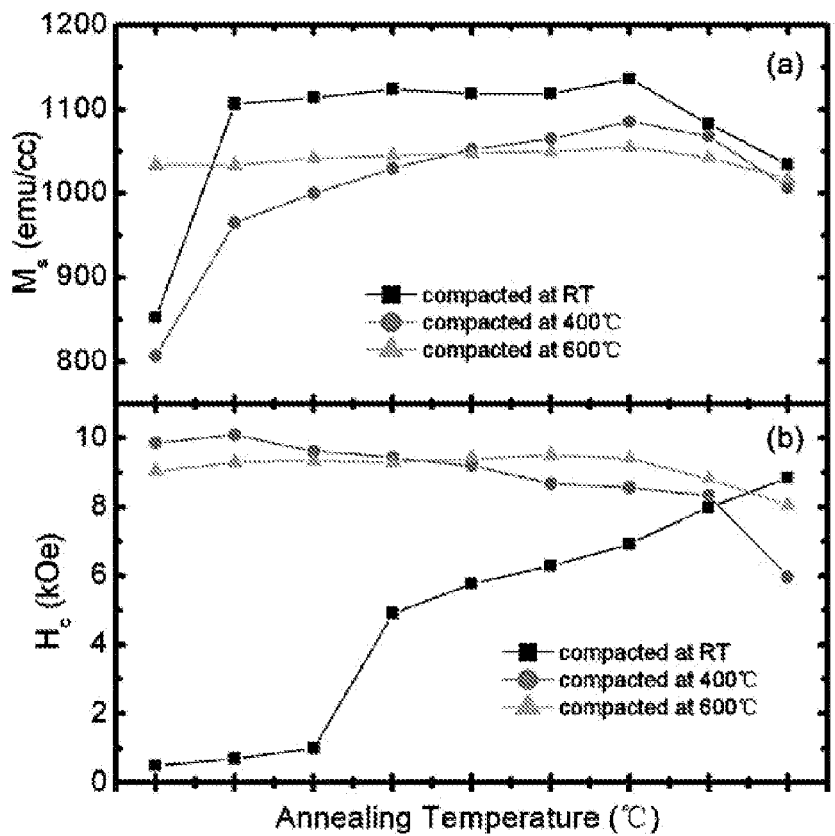
FIG. 20A
FIG. 20B

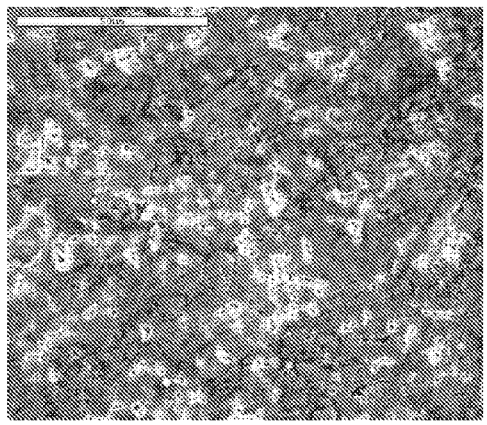 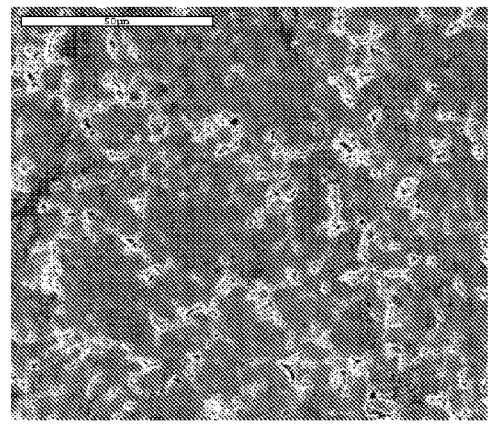
FIG. 23A　　　　　　　　　　　　FIG. 23B
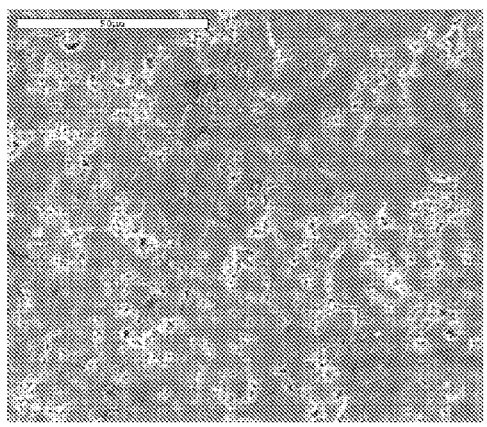 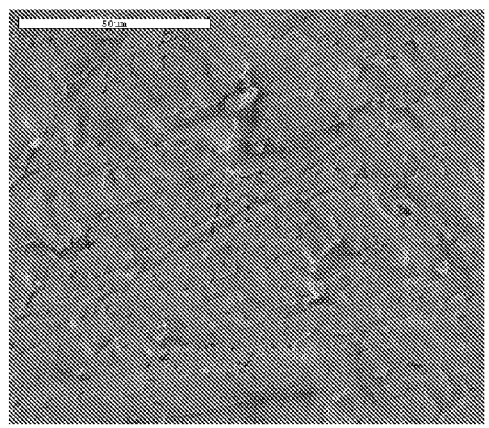
FIG. 23C　　　　　　　　　　　　FIG. 23D
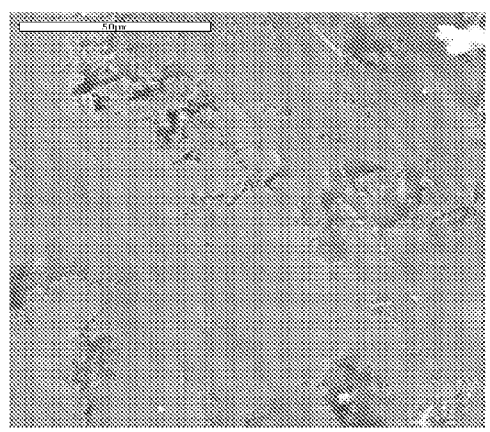 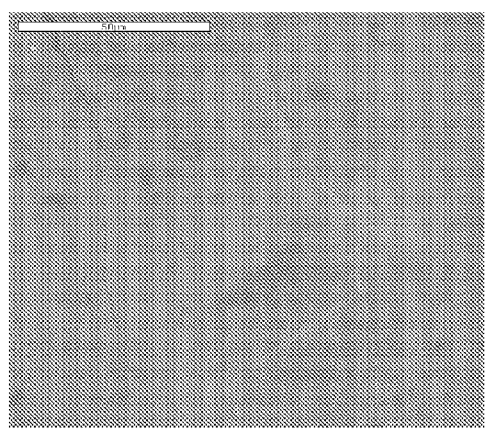
FIG. 23E　　　　　　　　　　　　FIG. 23F

MAGNETIC NANOPARTICLES, BULK NANOCOMPOSITE MAGNETS, AND PRODUCTION THEREOF

CROSS-RELATED APPLICATIONS

This application claims priority to U.S. provisional application Ser. No. 61/016,353, filed Dec. 21, 2007, incorporated by reference herein.

GOVERNMENT RIGHTS STATEMENT

This invention is made under Government support DoD/MURI under Grant No. N00014-05-1-0497 and DoD/DARPA through ARO under Grant No. DAAD-19-03-1-0038. The U.S. Government may have certain rights to this invention.

BACKGROUND OF THE INVENTION

The present invention relates generally to magnetic nanoparticles and more particularly to bulk magnetic nanocomposites.

The size distribution of nanoparticles obtained by ball milling can be wide compared with chemical synthesis methods. Chemical synthesis methods have limited success in the synthesis of hard magnetic nanoparticles of rare-earth compounds.

The grain size in nanocomposite magnets fabricated by conventional top-down methods, including mechanical alloying and rapid quenching, usually has a wide distribution, and can hardly be controlled below the critical length. Fabrication of high density bulks with controlled grain size and grain alignment of the hard magnetic phases remains challenging. An alternative bottom-up approach fabricates nanocomposite magnets with controllable nanoscale morphology. The embodiments disclosed herein solves these problems, as well as others.

SUMMARY OF THE INVENTION

Provided herein are systems, methods and compositions for magnetic nanoparticles and bulk nanocomposite magnets.

The methods, systems, and compositions are set forth in part in the description which follows, and in part will be obvious from the description, or can be learned by practice of the methods, compositions, and systems. The advantages of the methods, compositions, and systems will be realized and attained by means of the elements and combinations particularly pointed out in the appended claims. It is to be understood that both the foregoing general description and the following detailed description are exemplary and explanatory only and are not restrictive of the methods, compositions, and systems, as claimed.

BRIEF DESCRIPTION OF THE FIGURES

The accompanying drawings, which are incorporated in and constitute a part of this specification, illustrate aspects of the methods, compositions, and systems and together with the description, serve to explain the principles of the methods, compositions, and systems.

FIG. 2B is a perspective view of the first press system; FIG. 2C is a schematic of the first press system; and FIG. 2D is an enlarged schematic view of the central portion of the pressure vessel.

FIG. 5A the as-milled nanoparticles with sizes about 4-50 nm, FIG. 5B nanoparticles separated by centrifugal separation, FIG. 5C nanoparticles separated by 2-5 hrs. settling-down time; and FIG. 5D nanoparticles separated after 20-30 mins settling-down time.

FIG. 10A is 4 nm FePt/1 nm $Fe_3O_4$ bimagnetic nanoparticles; FIG. 10B, is 6 nm FePt/2 nm $Fe_3O_4$ bimagnetic nanoparticles; FIG. 10C, is 8 nm FePt/2 nm $Fe_3O_4$ bimagnetic nanoparticles; FIG. 10D, is 7 nm FePt/1 nm $Fe_3O_4$ bimagnetic nanoparticles; and FIG. 10E, is 7 nm FePt/3 nm $Fe_3O_4$ bimagnetic nanoparticles.

FIGS. 13A-13C are Scanning Electron Microscope ("SEM") images of the bulk samples compacted at 20, 400, and 600° C., respectively.

FIG. 14 is a graph of the X-Ray Diffractometer ("XRD") patterns of the bulk samples compacted at 20° C. for (a), 400° C. for (b), and 600° C. for (c); where the symbol (0) and full line represent the observed and calculated x-ray diffraction profiles, respectively, and the vertical bars represent the Bragg reflection positions of the observed phases (from top to bottom: $L1_0$, FePt, and $Fe_3O_4$, and where the difference curve is plotted in the bottom.

FIG. 15 is a graph of the dependence S on $T_{cp}$ for the bulk samples, where the dependence of S on annealing temperature of the starting powder is also included for 10 min annealing.

FIG. 16 is a graph of the dependence of $M_s$ and $H_C$ on $T_{cp}$.

FIGS. 17A and 17B are graphs of the dependence of grain size and microstrain on $T_{cp}$ for as-compacted samples and the grain size of the annealed samples and the compacted $L1_0$ nanoparticles.

FIGS. 18A-D are TEM micrographs of bulk samples compacted at different temperatures, 20° C. in FIG. 18A, 400° C. in FIG. 18B, 600° C. in FIG. 18C, and FIG. 18D is a graph of SAED patterns at different temperatures.

FIG. 19B is a graph of $\delta m$ plots of the separated $L1_0$ particles and samples compacted at 2.5 GPa, 200° C. from the $L1_0$ nanoparticles as well as the post-annealed bulk samples, where the inset of the FIG. 19B is a graph of the hysteresis loops of the $L1_0$ nanoparticles.

FIGS. 20A-20C are graphs of the dependence of $M_s$, $H_C$, and $(BH)_{max}$, respectively, on the annealing temperature for 20, 400, and 600° C. compacted samples.

FIGS. 23A-23F are SEM images of the surface of the bulk SmCo/Fe samples compacted from the amorphous powders at different temperatures, room temperature, 200° C., 300° C., 400° C., 500° C., and 600° C., respectively.

DETAILED DESCRIPTION OF THE PREFERRED EMBODIMENTS

The methods, compositions, and systems can be understood more readily by reference to the following detailed description of the methods, compositions, and systems and the Examples included therein and to the Figures and their previous and following description.

The term "nanoparticles" includes particles having an average size between about 2 and about 100 nm, preferably particles having an average size between about 2 and about 100 nm. Most preferably, the nanoparticles have an average size between about 2 and about 10 nm. The term "nanocomposites" includes composites including more than one nanoparticle.

Figure 1:
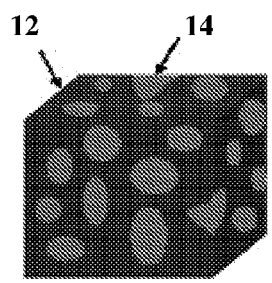
FIG. 1 is one embodiment of a bulk nanocomposite.
Figure 2A:
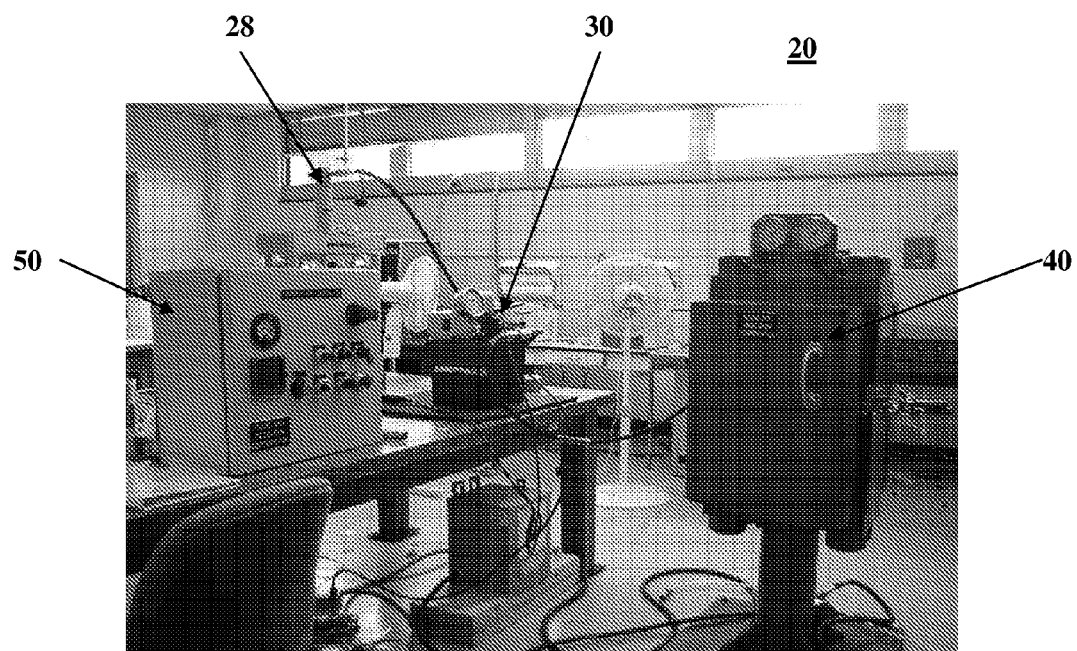
FIG. 2A is one embodiment of a warm compaction apparatus.

Generally speaking, a bulk nanocomposite magnet 10 comprises at least one hard magnetic phase material 12 and at least one soft magnetic phase material 14, as shown in FIG. 1. The hard phase magnetic material 12 and the soft phase magnetic material 14 are warm compacted with a warm compaction apparatus 20, as shown in FIG. 2A, under pressure of at least about 0.1 to 6 GPa for a period of time of at least about 1 minute to 30 hours at temperatures ranging from about 20° C. to 700° C. to produce the bulk nanocomposite 10. In one embodiment, the hard and soft phase material may be modified in a pre-warm compaction step, i.e before warm compacting, such as by mixing, heating, annealing, or ball milling. The density of the compacted bulk magnetic materials increases with the compaction pressure and temperature, while the nanostructured morphology is retained. Phase transition temperatures of the compacted materials can be altered in the warm compaction technique and the phase transition facilitates the consolidation of the bulk nanocomposite 10. Modest temperatures maintain the chemical stability of the hard and soft phase material. The warm compaction mechanism is based on surface/grain boundary diffusion induced deformation, by optimizing Pressure, Temperature, and Time (i.e. P-T-t combination), which is related to the press design and the nanoparticle characteristics. In one embodiment, the warm compaction and consolidation of the hard phase and soft phase magnetic material includes magnetic nanoparticles includes an average size of about 1 nm to about 100 nm. In another embodiment, the hard and soft phase magnetic material includes magnetic powder, where the magnetic powder includes magnetic microparticles including an average size of about 1 μm to about 100 μm.

Interphase exchange coupling is enhanced upon the compaction of the hard and soft phase material. Effective interphase magnetic exchange coupling in the bulk nanocomposite is achieved by limiting the dimensions of the soft phase material to a nanoscale critical length, as determined by Zambano et al. "Dependence of Exchange Coupling Interaction on Micromagnetic Constants in Hard/soft Magnetic Bilayer Systems", Physical Review B, 75: 144429-1-7 (2007), herein incorporated by reference. In one embodiment, post-annealing the bulk nanocomposite 10 under a forming gas at an elevated temperature to improve the magnetic performance of the bulk nanocomposite 10 owing to interface modification. Additionally, grain growth and grain size is controlled with warm compaction by selecting P-T-t profiles to ensure chemical stability of the magnetic nanoparticles. The bulk nanocomposite includes a controlled grain size for intergrain magnetic exchange coupling and high energy products.

"Bulk" is a term used in the application to mean any nanocomposite magnet having a dimension of at least about 0.5×0.5×0.5 mm, preferably at least about 1×1×1 mm, most preferably at least about 3×1.2×0.5 mm, alternatively between 6×1.5×0.5 mm. "Bulk nanocomposite" is also referred to as a "compact". The bulk nanocomposite 10 may include a general three dimensional shape including a rectangular shape, cubical, cuboidal, cylindrical, polyhedronal, and the like. The "soft phase material" 14 comprises at least one of FeO, $Fe_2O_3$, $Fe_3O_4$, Co, Fe, Ni, CoFe, NiFe, CoO, NiO and other related oxides including doped ferrites including, but not limited to $MFe_2O_3$ where M comprises one of Co and Ni. The "hard phase material" 12 comprises at least one of FePt, CoPt, SmCo-based alloys, including $SmCo_5$, $Sm_2Co_{17}$, $Sm_2Co_7$, and $SmCo_7$, and rare earth-FeB-based alloys, including $R_2Fe_{14}B$, where R=Nd or Pr, i.e. Nd—FeB and Pr—FeB. The hard phase material and the soft phase material may be mixed pre-warm compaction at a mass ratio of 10:1 to about 5:1, alternatively about 8:1 to about 2:1, alternatively about 1:1. The mass ratio used for mixing the hard and soft phase material depends on the hard and soft phase material selected for warm compaction.

For nanoparticles, the limit for density ("$\rho_p$") of a randomly packed nanoparticle system is only 64% if no deformation is involved. To obtain a higher $\rho_p$, plastic deformation of the particles is necessary and is obtained in the warm compaction process. For nanoparticles, the deformation is not as easy as for large nanoparticles because of the reduced dislocations in the nanoparticles, and a lower density values obtained in large nanoparticles warm compacted into a bulk nanocomposite. The bulk samples $\rho_p$ is dependent on the compaction temperature ("$T_{cp}$") under different pressures. The density of the bulk composite increases monotonously with compaction temperature.

In one embodiment, the bulk nanocomposite magnets are prepared by warm compacting hard phase and soft phase magnetic nanoparticles and/or nanocomposite particles. Generally speaking, the warm compaction apparatus 20 is shown in FIG. 2A. The warm compaction apparatus 20 includes a first press system 28, a hydraulic pump 30, a second press system 40, and a temperature controller 50. The first press system 28 is operably coupled to the temperature controller 50 to control the temperature of the first press system 28. The second press system 40 is operably coupled to the hydraulic pump 30 to provide additional pressure to the first press system 28. The first press system 28 is shown in FIG. 2B, and includes a pressure generator 22 with at least one piston, a pressure plate 26 with a plurality of heating elements, a pressing chamber 24, and a temperature controller (not shown). FIG. 2C shows the schematic portion of the pressure chamber 24, which includes an end load ram 60, a main hydraulic ram 62, an end load spacer 64, a thermocouple spacer 66, a stack top plate 68, a pressure vessel 70, and a bridge 72. FIG. 2D shows an enlarged view of the central portion of the pressure vessel 70, which includes a base plug 74, a pyrophyllite sleeve 76, a halite 78, a pyrex sleeve 80, a graphite furnace 82, a powder portion 84, a sample cup and lid 86, and a thermocouple well 88. The powder portion 84 may include alumina or MgO powder. The sample cup and lid 86 is where the nanocomposites are placed for warm compaction. The bulk nanocomposite magnet may also be modified post-warm compaction to enhance magnetic characteristics or microstructure.

The hard and soft phase material may comprise magnetic nanoparticles. The magnetic nanoparticles may include varied characteristics to enhance the magnetic properties of the bulk nanocomposite 10. For example, the magnetic nanoparticle microstructure or morphology may include, but is not limited to, a specific size, such as spherical, aspherical, elongated nanorods, bricklike, wire, cube, hexagonal and tetragonal structures, plate-like structures, monodisperse, polycrystalline, monocrystalline, a specific grain size, and shell of a non-magnetic, antiferromagnetic, or ferro/ferri-magnetic shell, which is otherwise known as a core/shell. The magnetic characteristics may include, but are not limited to, a specific coercivity, magnetocrystalline anisotropy, unsaturated loops, superparamagnetic, ferromagnetic, low or high remanence ratio, single phase-like magnetization, amorphous structure, and exchange coupling. In one embodiment, the hard phase material may comprise a plurality of FePt nanoparticles with fcc structure, fct structure, or $L1_0$-phase structure. In another embodiment, the hard and soft phase material may comprise amorphous or crystallized powders.

The magnetic nanoparticles may be modified pre-warm compaction to obtain the magnetic characteristics or microstructures, such as by a heating, annealing, or a ball milling step. In one pre-warm compaction step, the ball milling step may include a gas or a liquid as the media for ball milling for the microstructure or morphology. In one embodiment, the pre-warm compaction step includes synthesizing the particles (nano or micro) and mixing the hard and soft phase particles by ball milling (with a gas or liquid as the media) to form the required nanocomposite morphology. Magnetic nanoparticles may be synthesized or modified by any known method to obtain magnetic characteristics or microstructure, none which are intended to limit the scope of the bulk nanocomposite magnets prepared by warm compaction, some of which are described below.

Magnetic Nanoparticles

In one embodiment, the magnetic nanoparticles are synthesized by an airless chemical solution procedure otherwise known as chemical reduction/thermal decomposition. The hard phase and soft phase magnetic nanoparticle material may be synthesized by this method. One example of the standard airless technique uses an argon atmosphere and 0.5 mmol of platinum acetylacetonate ("$Pt(acac)_2$") is added to 125 mL flask containing a magnetic stir bar and mixed with 20 mL of octyl/benzyl ether, as disclosed in Nandwana et al. "Size and Shape Control of Monodisperse FePt Nanoparticles" J. Phys. Chem. C, 111: 4185-4189 (2007), herein incorporated by reference. After purging with argon for 30 min at room temperature, the flask is heated up to 120° C. for 10 min and a designated amount of oleic acid and oleylamine is added. Iron pentacarbonyl ("$Fe(CO)_5$") or iron acetylacetonate ("$Fe(acac)_3$") is used as an iron precursor. Iron acetylacetonate (0.5 mmol) is added at room temperature while iron pentacarbonyl (1.0 mmol) is added at 120° C. when the platinum precursor dissolved completely. The dissolution of $Pt(acac)_2$ in solvent could be followed experimentally by the change of color of the solution from off yellow to transparent yellow. After the addition of $Fe(CO)_5$, the color transition from golden to black suggested formation of nanoparticles in the solution. Then it is heated to 298° C. for 1 h before cooling to room temperature under the argon blanket. Argon gas is flowed throughout the experiment. The heating rate is varied from 1 to 15° C. per minute according to the experimental design.

The black product is precipitated by adding ethanol and separated by centrifugation and redispersed in hexane. To achieve the highest purity, extra ethanol is added in this dispersion and the dispersion is centrifuged again. Because all the particles are quite homogeneous, size selection is not necessary. After washing the particles in ethanol three or more times, they are dispersed in hexane and stored in glass bottles under refrigeration. Samples for magnetic characterization are prepared by depositing a drop of the final hexane dispersion on a 3×3 mm silicon substrate, evaporating the solvent at room temperature and further drying in vacuum, which led to the formation of FePt nanoparticle-assembled thin films. The samples are then annealed at 650° C. for 1 h under the flow of forming gas (Ar+7% $H_2$) in a tube furnace.

Figure 3A:
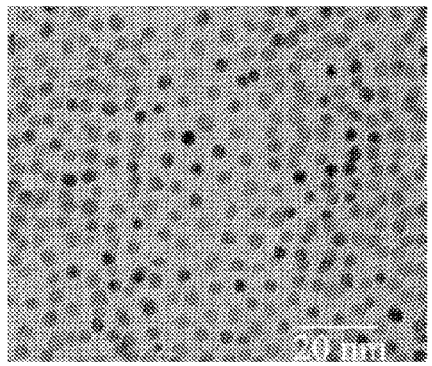
FIGS. 3A-3F are Transmission Electron Microscope ("TEM") images of the as-synthesized FePt nanoparticles of sizes 4 nm, 3 nm, 9 nm, 7 nm, 6 nm, and 2 nm, respectively.
Figure 3B:
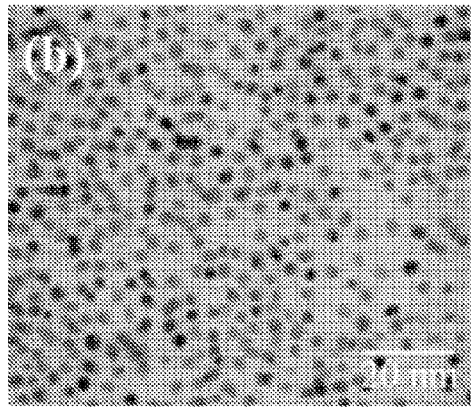
Figure 3C:
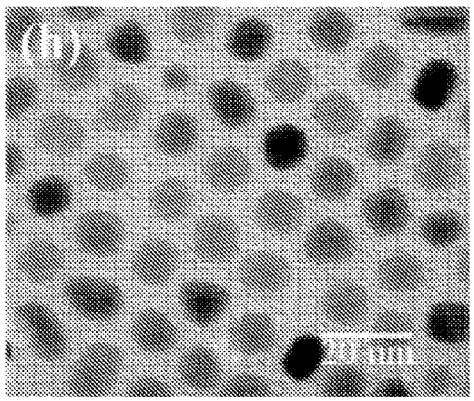
Figure 3D:
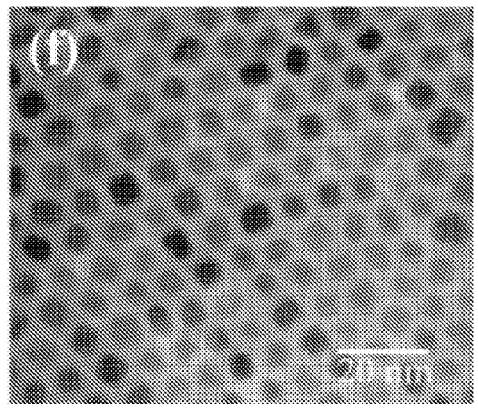
Figure 3E:
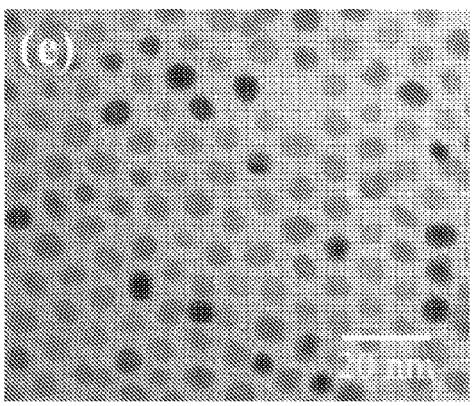
Figure 3F:
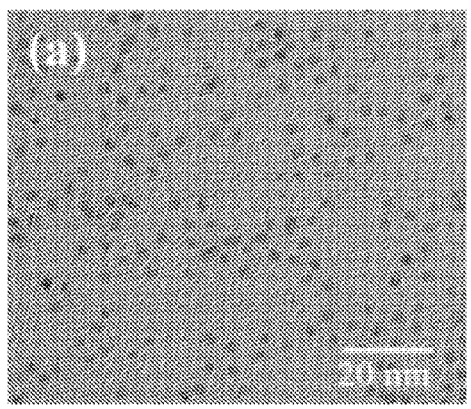

Fine-tuning of the sizes of the FePt nanoparticles between 2 and 9 nm may be achieved by controlling the surfactant to metal ratio and the heating rate, as disclosed in Nandwana et al. "Size and Shape Control of Monodisperse FePt Nanoparticles" J. Phys. Chem. C, 111: 4185-4189 (2007), herein incorporated by reference. As shown in FIG. 3A, when the heating rate of the reaction is maintained at 5° C., FePt nanoparticles with average size of 4 nm are obtained when the molar ratio of surfactant to $Pt(acac)_2$ is 1. By decreasing the molar ratio to 0.75, the nanoparticle size decreases to 3 nm, as shown in FIG. 3B. By increasing the molar ratio to 10, the nanoparticle size increased to 9 nm, as shown in FIG. 3C. And as the heating rate increased from 5 to 10 and then to 15° C./min, the average nanoparticle size decreases from 8 to 7 nm, as shown in FIG. 3D and then to 6 nm when using the surfactant ratio of 5, as shown in FIG. 3E. The increased heating rate increases the nucleation rate, i.e. more nuclei forms at the initial stage. Alternatively, when the heating rate is decreased to 1° C./min, the nanoparticle size is decreased to 5 nm. And when $Fe(acac)_3$ is substituted for $Fe(CO)_5$ as a precursor, nanoparticles of 2 nm are obtained, as shown in FIG. 3F. Alternatively, to make larger FePt particles, a seed-mediated growth method is used. This is performed by first making monodisperse 3-4 nm seed FePt particles, and then adding more Fe and Pt precursors to enlarge the existing FePt nanoparticle seeds to obtain the desired sizes. Alternatively, control of the size of the FePt nanoparticles is obtained through one step simultaneous thermal decomposition of $FeCO_5$ and reduction of $Pt(acac)_2$ in the absence of 1,2-alkanedial. 1,2-alkanediol leads to the facile reduction of $Pt(acac)_2$ to Pt, resulting in fast nucleation of FePt and consumption of metal precursors resulting in smaller particles. Therefore, removal of the additional reducing agent slows down the nucleation rate, allowing more metal precursors to deposit around the nuclei, and leading to a larger nanoparticle size. The nanoparticles can be annealed in forming gas of Ar+7% $H_2$ at 650° C. for 1 hr., which increases coercivity based on the fcc-fct phase transition. The disordered face-centered cubic ("fcc") structure has low magnetocrystalline anisotropy, so heat treatment is necessary to convert the fcc structure to the ordered face-centered tetragonal ("fct") structure, described by the chemical-ordering parameter S. The $L1_0$-FePt phase is based on the crystalline ordering of the fct structure and the $L1_0$-FePt phase has high uniaxial magnetocrystalline anisotropy.

Samples for magnetic measurements are prepared by embedding the nanoparticles in epoxy inside the glove box. Magnetic measurements at room temperature are performed using an alternating gradient magnetometer with measuring field up to 14 kOe, and at 5 K using a superconducting quantum interference device ("SQUID") with measuring field up to 70 kOe. Structural and morphological characterizations are performed using transmission electron microscope ("TEM"), and x-ray diffractometer ("XRD"). Compositional characterizations are performed using energy dispersive x-ray spectroscopy ("EDX") and inductively coupled plasma ("ICP").

In another embodiment, the magnetic nanoparticles are produced by a polyol process. The use of a diol or polyalcohol (for example, ethylene glycol) to reduce metal salts to metal particles is also referred to as the "polyol process". By mixing and heating both an iron salt and a platinum salt with the polyol, high-quality FePt nanoparticles can be produced. Alternatively, monodisperse $SmCo_5$ nanoparticles are synthesized by coupling the polyol reduction of samarium acetylatacetonate, ("$Sm(acac)_3$"), with the thermal decomposition of $Co_2(CO)_8$. For FePt, a slight modification of the decomposition/reduction condition by replacing $Fe(CO)_5$ with $Fe(acac)_2$ or $Fe(acac)_3$ leads to monodisperse 2-3 nm diameter FePt nanoparticles. The stronger organic reducing agent hydrazine ($N_2H_4$) may be used to reduce metal salts and form FePt nanoparticle in water at low temperature. In this synthesis, $H_2PtCl_6.H_2O$ and $FeCl_2.H_2O$, together with hydrazine and a surfactant, such as sodium dodecyl sulfate ("SDS") or cetyltrimethylammonium bromide ("CTAB"), are mixed in water. The hydrazine reduces the metal cations at 70° C., resulting in fcc-structured FePt nanoparticles. One example of a modified polyol process is disclosed in Elkins et al "A Novel Approach to Synthesis of FePt Magnetic Nanoparticles" Journal of Nano Research, 1: 23-29 (2008), herein incorporated by reference. The modified polyol process includes $Pt(acac)_2$ and $Fe(acac)_3$ in the molar ratio 1:1 is taken in a 125 mL flask containing a PTFE coated magnetic stir bar at room temperature. 1,2-hexadecanediol (5 times mole amount of $Pt(acac)_2$ and $Fe(acac)_3$) is added to the flask. 30 mL of dioctyl ether is then transferred into the flask and the contents are stirred while purging with Ar for 30 mins. at room temperature. The flask is then heated to 200° C. at 6° C./min. by use of a Glas-Col hemispherical heating mantel connected to a programmable heat controller using a type J thermocouple. Once the temperature reached 200° C., the flask is kept at this temperature for 30 minutes. After the 30 minute hold, the flask is heated to 295° C. at a rate of approximately 5° C. per minute. The flask is maintained at a refluxing temperature of 295° C. for 30 min. before cooling down to room temperature under the Ar purge. Afterwards, all handling is performed open to the atmosphere. Purification of the nanoparticles is accomplished as follows: 5 mL of the dispersion taken from the flask is added to 20-25 mL of ethyl alcohol ("EtOH") and the mixture is centrifuged 6000 rpm for 15 min. The supernatant is discarded and the precipitate is redispersed in 10 mL of hexane. The dark brown dispersion is stored under refrigeration at approximately 10° C. The FePt nanoparticles include an average size of 2 nm and have a spherical shape and narrow size distribution. The XRD patterns show that the FePt nanoparticles have a chemically disordered fcc structure. From the peak width of the XRD pattern, the average nanoparticle diameter of 1.6 nm is calculated using the Scherer formula.

In another embodiment, the magnetic nanoparticles are synthesized by surfactant-assisted ball milling, as disclosed in Chakka et al. "Magnetic Nanoparticles Produced by Surfactant-Assisted Ball Milling, J. Applied Physics, 99: 08E912 (2006), herein incorporated by reference. The starting powders have nanoparticle sizes from ~10 to 45 μm (−325 mesh). Fe powders with 98% purity and Co powders with 99.5% purity may be used. Alloy powders of Sm—Co (1:5 and 2:17), NdFeB (2:14:1), and FeCo are prepared by arc melting followed by grinding. The milling process and handling of the starting powders and the milled particles are carried out in an oxygen-free inert environment. In one embodiment, argon gas is used inside a glove box; alternatively other inert gases may be used included $N_2$ and the like. The starting powders are milled under a liquid or organic solvent, including ethanol or heptane. Heptane may include purity approximately 90-100%, alternatively 99.8%. The starting powders are also ball milled with a surfactant. Surfactants are characterized by having one long hydrocarbon chain per surfactant headgroup. In one embodiment, oleic acid and oleyl amine are used as surfactants during milling, where oleic acid may include a purity of 85-100%, alternatively 90% and oleyl amine may include a purity of 90-100%, alternatively greater than 98%. Other surfactants that may be used include, but are not limited, derivatives of oleic acid, erucic acid, linoleic acid, and the other long chain carboxylic acids surfactants. The surfactants used are absorbed by the fresh surface of particles crushed during the ball milling, leading to a surface modification for the ground particles. The amount of surfactant used is approximately 5-20% by weight of the starting powder, alternatively 7-15% or 10-12% by weight of the starting powder may be used. The mixtures were ball milled in a vibrating or rolling vial containing balls and the balls may include stainless steel, hardened steel, carbide or other ceramic balls. In one embodiment, high energy Spex 8000M mill with the milling vial and the balls made of 440 C hardened steel are used for milling the nanoparticles. The milling durations are from 1 to 50 hrs. The milling time and vibrating strength are adjusted to form the desired nanocomposite morphology. The ball to powder weight ratio may include 10:1 to about 2:1, alternatively 6:0.5 to about 7:3, or 5:1.

Figure 4A:
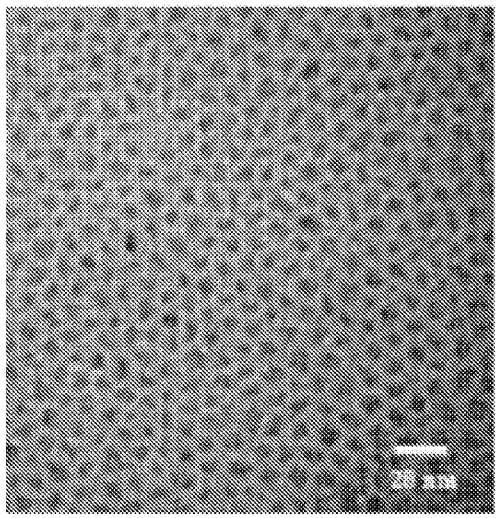
FIGS. 4A and 4B are TEM images of the nanoparticles prepared by surfactant-assisted ball milling of Fe powders for 1 hr and 5 hrs., respectively.
Figure 4B:
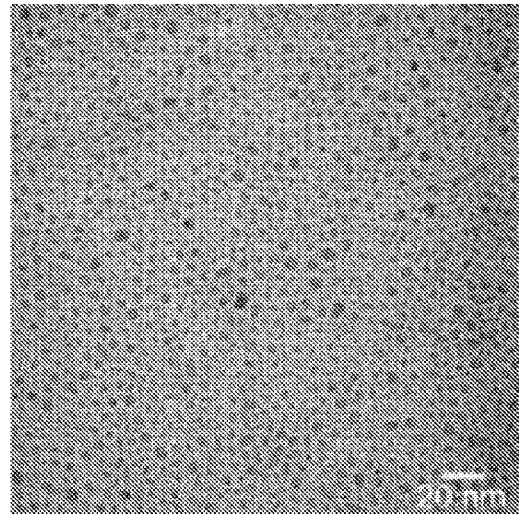

When the surfactant is used along with heptane during milling a colored liquid is obtained along with coarse particles, referred to as a slurry, which remain as sediment at the bottom of the milling vial after milling. The colored liquid contains a dispersion of nanoparticles smaller than 30 nm. As shown in FIG. 4A, TEM images of the nanoparticles prepared by milling Fe powders for different milling durations 1, 5, 15, 25, and 50 hr. using oleic acid as the surfactant show spherical or aspherical nanoparticles in sizes ranging from 3 to 9 nm. There is no significant change in morphology of the nanoparticles with increase in milling time up to 50 h for the Fe powders. FIG. 4B shows nanoparticles with very a narrow size distribution 4-6 nm obtained by milling Fe powders for 1 h and by using stainless steel 316 SS balls instead of hardened steel balls. As seen in FIG. 4B, the nanoparticles self assemble into a regular pattern, which can be achieved by controlled evaporation of the solvent after depositing the nanoparticle dispersion liquid on the TEM grid. Similarly, FeCo powders show ultrafine spherical nanoparticles with a narrow nanoparticle size distribution ranging from 1.7 to 4.0 nm for samples ball milled using oleic acid. However, milling of Co particles with oleic acid results in a jelly-like mass, not a liquid with nanoparticle dispersion, which makes separating the nanoparticles from the solution difficult. A liquid with nanoparticle dispersion is obtained by milling Co particles with oleyl amine and the morphology of the nanoparticles shows mostly aspherical nanoparticles with a few elongated nanorods for the 5 hr.-milled sample. With increasing milling time, the percentage of elongated nanorods increased. For the sample prepared by milling for 10 hr., the aspherical particles with size ranging from 2 to 8 nm are obtained. Elongated rods with width of 2-3 nm and lengths from 10 to 18 nm aspect ratios 5-9 are also obtained. Such elongated nanostructures have not been observed in the case of nanoparticles prepared by milling Fe and FeCo powders. Superparamagnetic behavior is observed at room temperature for the ball milled Fe, Co, and FeCo nanoparticles. Magnetic measurements at 5 K using SQUID show some hysteresis with coercivities up to 400 Oe, and an unsaturated loop even at 70 kOe, implying a combination of superparamagnetic and ferromagnetic behavior at 5 K.

Figure 4C:
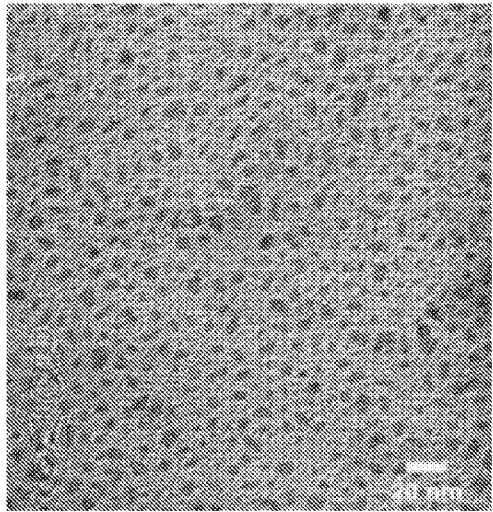
FIGS. 4C and 4D are TEM images of nanoparticles prepared by surfactant-assisted ball milling $SmCo_5$-based powders for 5 hr. and 25 hrs., respectively.
Figure 4D:
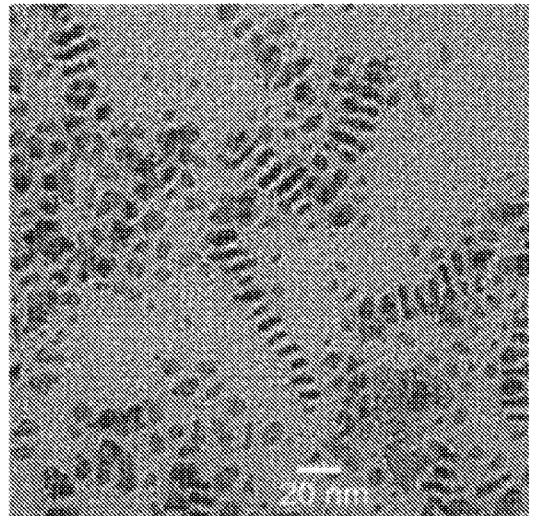

As shown in FIGS. 4C and 4D, the TEM images of the nanoparticles prepared by ball milling $SmCo_5$-based powders show that the morphology of the nanoparticles varies with increased milling time. Nanoparticles with size ranging from 3 to 13 nm are included in the 5 h-milled sample, which are mostly irregular and aspherical with a very small percentage of elongated particles. Elongated rod-shaped nanoparticles are included when the milling time is increased to 15 hr., along with other irregular particles. The percentage of elongated rod-shaped nanoparticles is increased further when the milling time is 25 hr. Elongated rod-shaped nanoparticles with length from 7 to 20 nm and width from 3 to 6 nm are included when the milling time is 25 h and the aspect ratios of the nanorods varies from 1.5 to 5. As shown in FIG. 4D, the rod-shaped nanoparticles tend to align parallel to each other on the TEM grid. Similar nanorod formations are also found in the case of nanoparticles prepared by milling $Sm_2Co_{17}$ and $Nd_2Fe_{14}B$-based powders with oleic acid. The nanorods are produced by fracture along some preferred crystalline orientation or anisotropic growth of the nanoparticles during the milling and increased temperatures locally inside the milling vial facilitate the anisotropic growth. Materials with hexagonal structure, $SmCo_5$, $Sm_2Co_{17}$, Co, and tetragonal structures, $Nd_2Fe_{14}B$, have a preferred orientation for fracture that are the close-packed planes [(0001) for hcp], and form plate-like structures, which upon further milling results in the formation of elongated nanoparticles. Magnetic properties of the ball milled $SmCo_5$, $Sm_2Co_{17}$ nanoparticles show hysteresis at room temperature with low coercivities (>100 Oe) and very low remanence ratio (remanence ratio=$M_r/M_s$) of less than 0.1. At 5 K the coercivity and the remanence ratio increased to $H_c$=1.6 kOe, $M_r/M_s$=0.42 for $SmCo_5$-based 25 h-milled samples. The remanence ratio increases with milling time. The magnetization curves of the nanoparticles by milling $SmCo_5$-based powder measured at 5 K show that the loops that $M_r/M_s$ values increase with milling time, from $M_r/M_s$=0.08 for a 5 hr.-milled sample to $M_r/M_s$=0.42 for the 25 hr.-milled sample. The NdFeB nanoparticles also include the remanence ratio enhancement with milling time at low temperatures. Remanence enhancement is due to the increasing percentage of elongated rod shapes and higher aspect ratios for longer milling time and/or the formation of most of the nanoparticles from the crystalline regions, which are the core of the primary nanoparticle, rather than the disordered boundary regions with increasing milling time.

In another embodiment, surfactant assisted ball milling includes starting powders of $SmCo_5$ and $Sm_2Co_{17}$ with the starting powder sizes from approximately 1-45 μm, as disclosed in Wang et al. "Sm—Co hard magnetic nanoparticles prepared by surfactant-assisted ball milling" Nanotechnology 18: 465701 (2007), herein incorporated by reference. Organic solvent of heptane (~99.8% purity) is used as the milling media and oleic acid (~90%) and oleyl-amine (~98%) are used as the surfactants during milling. The powders are ground in a milling vial with balls made of 440 C hardened steel by using a Spex 8000M high energy ball milling machine. Milling process and handling of the starting materials and the milled products are carried out in an argon gas environment inside a glove box to protect the particles from oxidation. Typical milling duration used is 20 hrs. with balls of ¼ inch in diameter. The weight ratio of powder to ball is set as 1:10. The amount of surfactant used is approximately 8%-10% and the used solvent is about 55% of the weight of the starting powder, respectively. The ground slurry is then dispersed into heptane solvent by ultrasonic vibration and transferred to a 50 ml centrifugal tube for size selection. Fe, Co, FeCo, and $Nd_2Fe_{14}B$ nanoparticles may also be used in the size selection process.

Figure 5A:
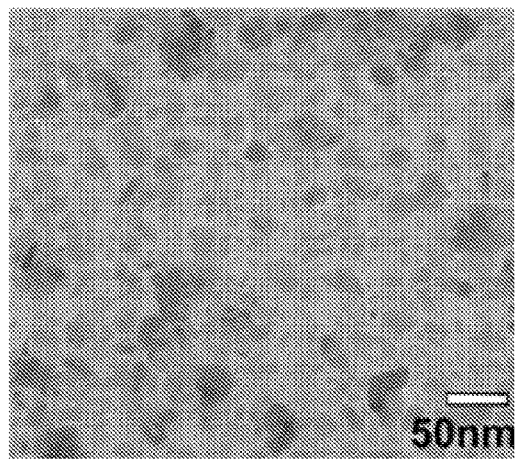
FIGS. 5A-5D are TEM images of $Sm_2Co_{17}$ nanoparticles ground for 20 h in heptane with surfactants.
Figure 5B:
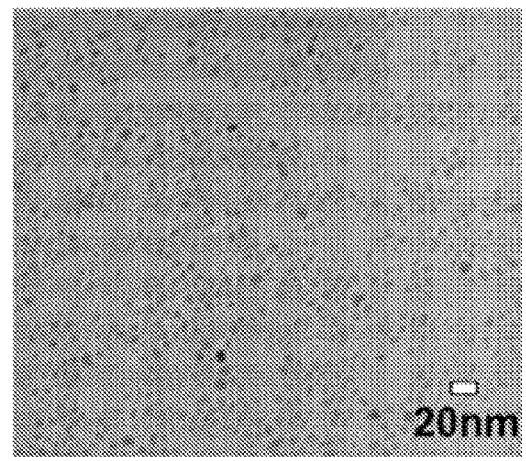
Figure 5C:
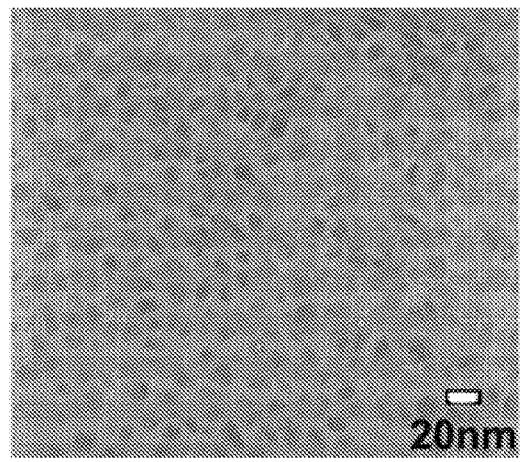
Figure 5D:
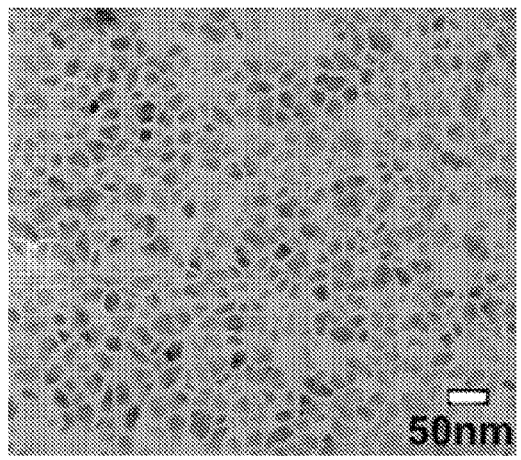

As shown in FIG. 5A, a TEM image of the $Sm_2CO_{17}$ sample ball milled for 20 hrs. show irregular shapes and a wide size distribution from several nanometers to larger than 50 nm. Different sizes of the nanoparticles are separated using centrifugal separation and controlling the "settling down" time of the nanoparticle solutions. "Settling down" time is the time the nanoparticles settle down after being dispersed by ultrasonic vibration. Small size nanoparticles float in the heptane solvent after centrifugation of 3000 rotations per minute ("rpm") for 25 min., which is relatively 1600 g in centrifugal force. Then the small size nanoparticles are separated by taking the supernatant after the centrifugation procedure 3000 rpm for 25 min. As shown in FIG. 5B, the morphology of the small size nanoparticles are shown with an average diameter of 6 nm. Large size nanoparticles are obtained by removing the small size nanoparticles in the supernatant and washing the slurry one time with heptane to remove any of the remaining small size nanoparticles. The washed slurry is then transferred to a surfactant-coated centrifugal tube and dispersed with heptane by ultrasonic vibration. The dispersed solution is then statically settled down for approximately 2-5 hrs., i.e. a settling down time of 2-5 hrs. After the settling down time of 2-5 hrs., a low speed centrifugal separation of 250-500 rpm (~45 g of centrifugal force) removes the largest particles. The morphology of the nanoparticles remained after the settling-down process is shown in FIG. 5C, where nanoparticles with average size of 13 nm are obtained. Larger size nanoparticles can be obtained with an average diameter of 23 nm with a shorter settling-down time of 20-30 min. As shown in FIG. 5D, the larger size nanoparticles display the typical morphology with an average diameter of size 23 nm.

Figure 6:
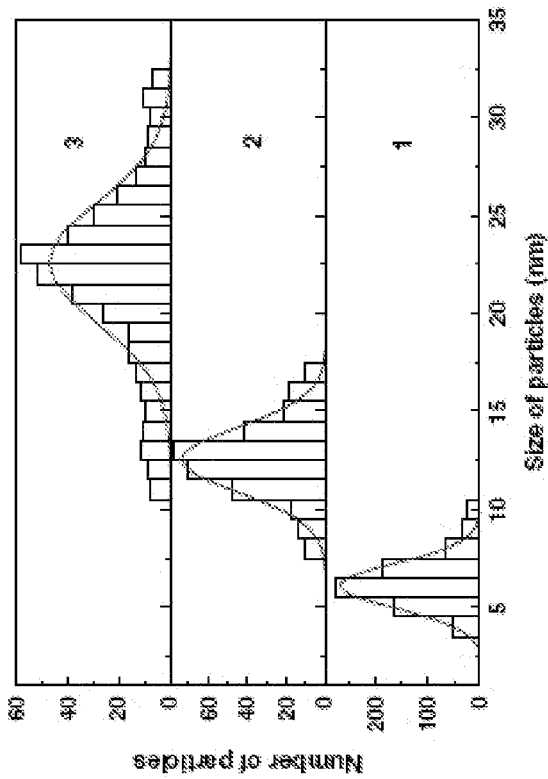
FIG. 6 is a graph showing the statistical size distributions of the selected nanoparticles.
Figure 7:
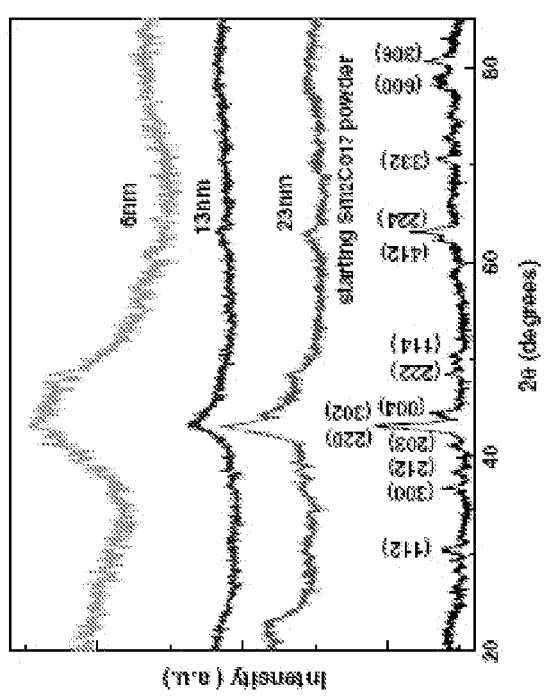
FIG. 7 is a graph of the X-ray scans of the ball-milled $Sm_2Co_{17}$ samples.

As shown in FIG. 6, a graph of the statistical size distributions of the nanoparticles after the size selection process. The charts 1, 2 and 3 correspond to the nanoparticles shown in FIGS. 5B, 5C, and 5D, respectively. Compared with the as-milled particles, the nanoparticles after the size selection have much more narrow size distributions. In FIG. 7, X-ray diffraction patterns of $Sm_2Co_p$ nanoparticles of different sizes (6 nm, 13 nm, and 23 nm) obtained by the size-selection process are shown and the pattern of the starting $Sm_2Co_{17}$ powder is shown for comparison. There are no peaks from oxides and pure iron and cobalt are presented in the diffraction patterns, indicating that the prepared nanoparticles are effectively protected from oxidation by handling the solution in the glove box and embedding the particles in epoxy. $SiO_2$ coating improves the oxidation resistance of the ground Sm—Co nanoparticles in air. The diffraction patterns show that no detectable contamination or decomposition in the particles has occurred. The EDX measurements show that the compositions of the nanoparticle samples are close to the compositions of the starting $Sm_2Co_{17}$ powder. FIG. 7 also shows that the diffraction peaks are broadened with the decreasing nanoparticle size.

Figure 8:
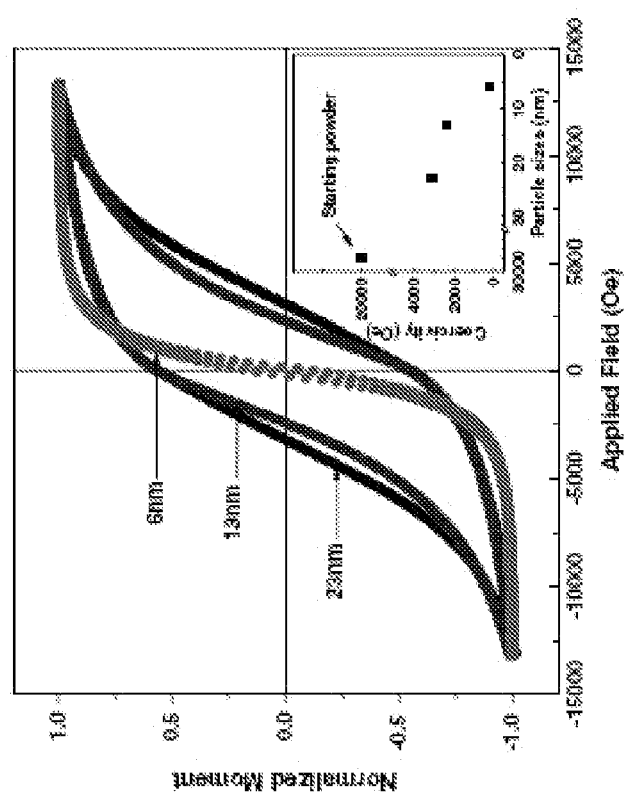
FIG. 8 is a graph of the room-temperature magnetization loops of the ball-milled $Sm_2Co_{17}$ nanoparticles with an average size of 23, 13, and 6 nm; and the inset in FIG. 8 is a graph of the particle size dependent coercivity of the nanoparticle samples.

In FIG. 8, the magnetization loops of the $Sm_2Co_{17}$ nanoparticles with different sizes, 6 nm, 13 nm, and 23 nm are shown by the blue, red, and black curves respectively. All the loops show a single-phase-like magnetization behavior with no kinks on the demagnetization curves, indicating no second phases in the particles. The inset in FIG. 8 shows the size-dependent coercivity of the particles. The starting powder, 23 nm, 13 nm and 6 nm samples have coercivity of 20 kOe, 3.1 kOe, 2.4 kOe and 170 Oe at room temperature, respectively. These values are significantly higher compared to the reported values of Sm—Co nanoparticles synthesized by other methods. The size dependent coercivity in these nanoparticles may be due to the increased defects in the smaller particles lower magnetocrystalline anisotropy. In addition, local strains can cause low-energy nucleation sites. Additionally, the ball milling may lead to partial amorphization in the nanoparticles and the smaller particles have more amorphous structure which leads to reduced coercivity.

In another embodiment, the nanoparticles can be synthesized by a salt-matrix annealing technique, as disclosed in Rong et. al. "Size-dependent chemical and magnetic ordering in $L1_0$ FePt nanoparticles" Advanced Materials, 18: 2984-2988 (2006), herein incorporated by reference. The fcc-structured FePt nanoparticles with different sizes (from 2 to 15 nm) are synthesized using the airless chemical-solution method with adjusted synthetic parameters. The fcc particles are then mixed with ball-milled NaCl powder in hexane or another organic solvent with the assistance of surfactants. Dry mixtures of FePt particles and NaCl powders are obtained after the solvent is evaporated completely. The mixtures are then annealed in a forming gas (93% Ar+7% $H_2$) at different temperatures for different times. After the annealing, the NaCl powder is washed away by deionized water and the FePt nanoparticles are recovered and dispersed in organic solvents, such as cyclohexane or ethanol, in the presence of surfactants. The elemental composition analyses, using inductively coupled plasma-optical emission spectroscopy ("ICP-OES"), show that there is negligible NaCl contamination in the salt-matrix-annealed FePt nanoparticles and the nanoparticle composition is $Fe_{52}Pt_{48}$. A transmission electron microscope is used to analyze the morphology and crystalline structures. X-ray diffraction ("XRD") is used to determine the phase transition, the long-range ordering parameters, the grain size, and the nanoparticle size. The magnetic hysteresis loops are measured with a magnetic properties measurement system ("MPMS") from specimens of a mixture of epoxy and the magnetic nanoparticles. Curie temperatures are measured by a physical properties measurement system ("PPMS") with high-temperature and high-vacuum vibrating sample magnetometer. With this technique, nanoparticle aggregation during the phase transformation has been avoided so that the true size-dependent properties of the fct phase can be measured. FePt nanoparticles with different sizes are annealed in a salt matrix at 973 K for 4 hr. Nanoparticles with nominal diameters of 2, 4, 6, 8, and 15 nm, can be obtained, and TEM images are shown in FIGS. 9A-9E for 2, 4, 6, 8, and 15 nm respectively. Annealed nanoparticles are monodisperse with a standard deviation of 5-10% in diameter. TEM observations also revealed that when the nanoparticle size is smaller than or equal to 8 nm, the fct nanoparticles are monocrystalline, whereas the 15 nm fct particles are polycrystalline.

Figure 9A:
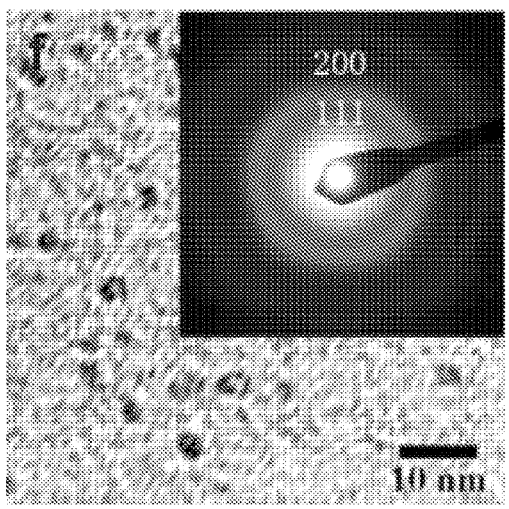
FIGS. 9A-9E are TEM images of salt-annealed FePt nanoparticles of 9A: 2 nm; 9B: 4 nm; 9C: 6 nm; 9D: 8 nm; and 9E: 15 nm, where the Selected-Area Electron Diffraction ("SAED") patterns are shown for the 2 and 15 nm salt-annealed particles as an inset in FIGS. 9A and 9E respectively.
Figure 9B:
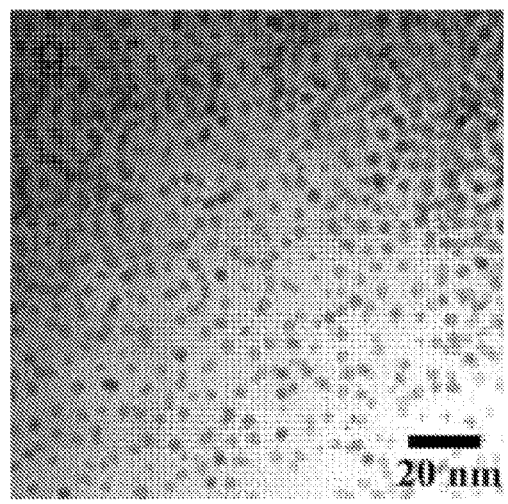
Figure 9C:
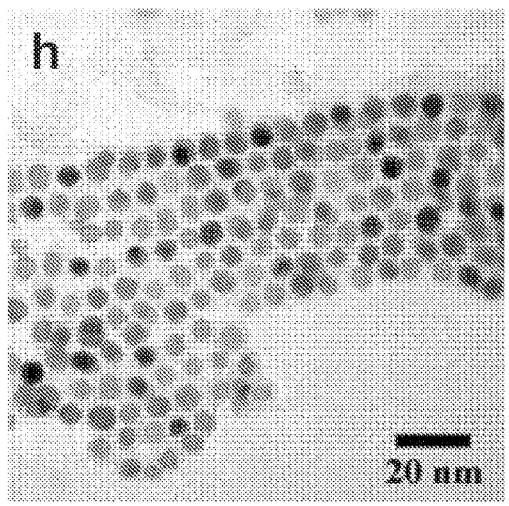
Figure 9D:
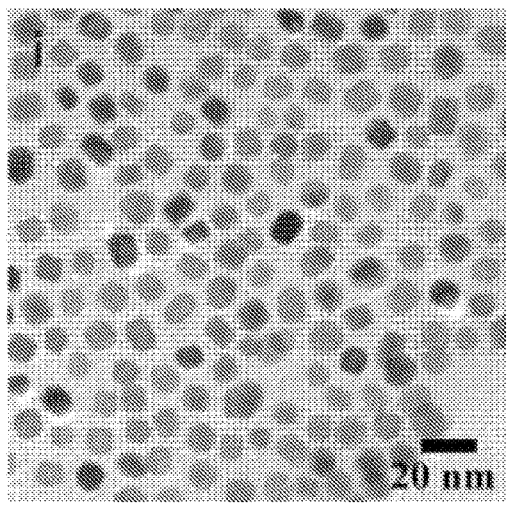
Figure 9E:
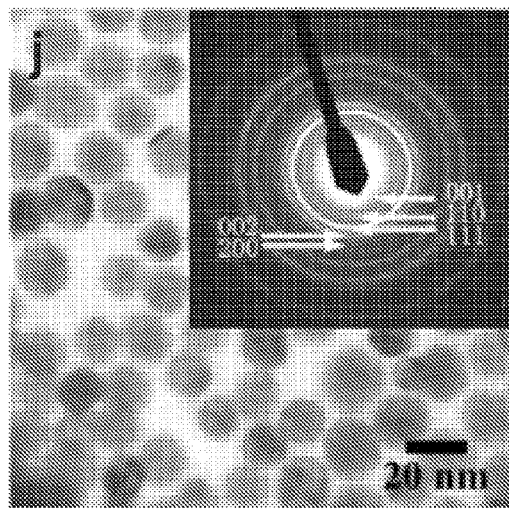

As shown in FIGS. 9B-9E, $L1_0$ nanoparticles are dispersed very well without agglomeration despite the dipolar interaction between the particles, if a solvent with high viscosity is chosen and if the solution is diluted. Extensive TEM and X-ray diffraction ("XRD") analyses shows salt-matrix annealing can be applied to heat-treatments of the FePt nanoparticles without leading to nanoparticle agglomeration and sintering, if a suitable salt-to-particle ratio and proper annealing conditions are chosen, as disclosed in Narayan et al., "Hard Magnetic FePt Nanoparticles by Salt-Matrix Annealing", J. Applied Physics, 99: 08E911 (2006), herein incorporated by reference. XRD patterns of the 4 nm, as-synthesized, fcc-structured nanoparticles and the particles annealed in a salt matrix at 873 K for 2 hr., 973 K for 2 hr., and 973 K for 4 hr. show the positions of the (111) peaks shift in the higher-angle direction with increasing annealing temperature and time. This shift is caused by the change of lattice parameters during the phase transition from fcc to fct. The (001) and (110) peaks are the characteristic superlattice peaks of the ordered fct phase and developed with increasing annealing temperature and time. For samples annealed at 973 K for 4 hr., the superlattice peaks (001) and (110) are fully developed, implying an fcc-fct transition. XRD patterns of the converted fct phase of 6, 8, and 15 nm nanoparticles annealed at 973 K for 4 hr. in a salt matrix. The grain sizes estimated by the Scherrer formula are about 4.7, 6.8, 8.2, and 13.3 nm for the 4, 6, 8, and 15 nm nanoparticles, Selected area electron diffraction ("SAED") is used to identify the crystalline structure of the particles, especially for the smaller particles. The SAED patterns show that the annealed nanoparticles are $L1_0$-fct phase if the nanoparticle size is equal to or larger than 4 nm, as shown in the inset of FIG. 9E, by the (001) and (110) rings. The SAED pattern of 2 nm particles as shown in the inset of FIG. 9A, does not show (001) and (110) rings.

Additionally, the magnetic nanoparticles may be coated with a shell of a non-magnetic, antiferromagnetic, or ferro/ferri-magnetic shell, which is otherwise known as a core/shell nanoparticle. A nonmagnetic coating is used routinely for magnetic core stabilization and surface functionalization for biomedical applications. An antiferromagnetic coating over a ferromagnetic core leads to exchange bias (a shift of the hysteresis loop along the field axis), and improvements in the thermal stability of the core. Compared with these two different types of core/shell systems, a bimagnetic core/shell one, where both core and shell are strongly magnetic (ferro- or ferri-magnetic) can be applied in electromagnetic and permanent magnetic applications. The intimate contact between the core and shell leads to effective exchange coupling and therefore cooperative magnetic switching, facilitating the fabrication of nanostructured magnetic materials with tunable properties. The bimagnetic core/shell also improves the compressibility in the warm compaction technique by controlling the soft phase shell thickness and composition. The ductility of the core/shell nanoparticles is increased compared with single-hard-phase nanoparticles. The increased ductility increases the warm compaction of core/shell nanoparticles. The core/shell nanoparticles can be also deformed to form texture during the warm compaction process.

Figure 10A:
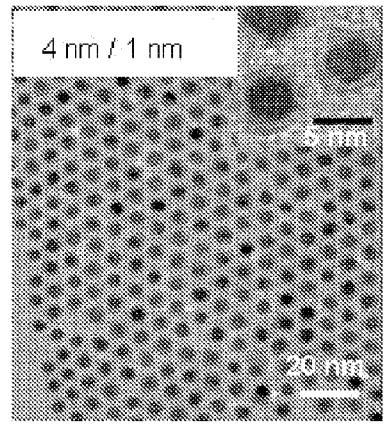
FIGS. 10A-10E are TEM images of bimagnetic FePt/$Fe_3O_4$ core/shell nanoparticles where
Figure 10B:
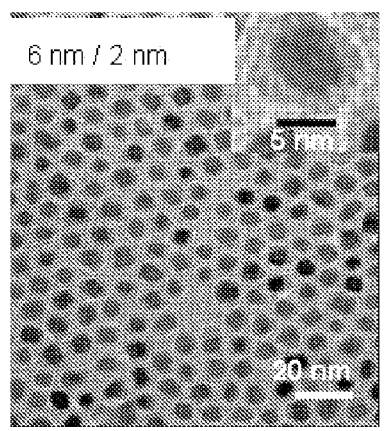
Figure 10C:
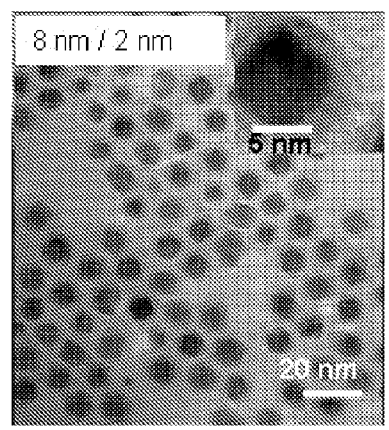
Figure 10D:
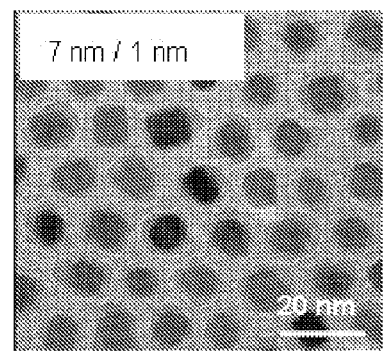
Figure 10E:
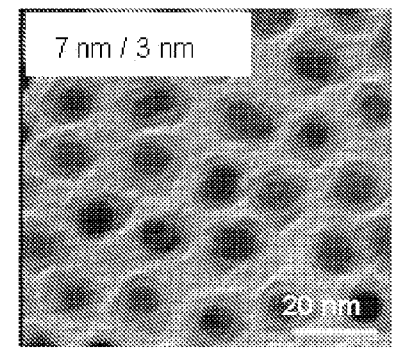

In one example of coating the magnetic nanoparticles, monodisperse FePt nanoparticles are synthesized by thermal decomposition of $Fe(CO)_5$ and polyol reduction of $Pt(acaca)_3$, as disclosed in Chaubey et al., "Synthesis and Characterization of Bimagnetic Bricklike Nanoparticles" Chem. Mater. 20; 475-478, (2008), herein incorporated by reference. An iron oxide coating is achieved via mixing and heating the FePt nanoparticle seeds with $Fe(acac)_3$/polyol, or $Co(acac)_2/Fe(acac)_3$/polyol precursors in phenyl ether in the presence of 1,2-hexadecanediol, oleic acid, and oleylamine. $FePt/Fe_3O_4$ nanoparticles are obtained by refluxing the FePt nanoparticle seeds with $Fe(acac)_3$/polyol in the reaction mixture at 265° C. for 30 min. Bimagnetic FePt/$Fe_3O_4$ nanoparticles are isolated by centrifugation. The size of the soft phase could be controlled by varying the material ratio of FePt nanoparticle seeds to $Fe(acac)_3$/polyol metal precursors. Reductive annealing can transform the bimagnetic nanoparticles into a hard magnetic nanocomposite with an enhanced energy product. In FIG. 10A, 4 nm FePt/1 nm $Fe_3O_4$ bimagnetic nanoparticles are shown by TEM. In FIG. 10B, 6 nm FePt/2 nm $Fe_3O_4$ bimagnetic nanoparticles are shown by TEM. In FIG. 10C, 8 nm FePt/2 nm $Fe_3O_4$ bimagnetic nanoparticles are shown by TEM. In FIG. 10D, 7 nm FePt/1 nm $Fe_3O_4$ bimagnetic nanoparticles are shown by TEM. In FIG. 10E, 7 nm FePt/3 nm $Fe_3O_4$ bimagnetic nanoparticles are shown by TEM. The cores appear darker and shells lighter in the images due to the large difference in electron penetration efficiency on FePt and oxides. The shell thicknesses are quite uniform and the main phase of the shell composes $Fe_3O_4$ as its structure is confirmed by XRD and TEM. The $FePt/Fe_3O_4$ nanoparticle is a two-phase system consisting magnetically of a hard FePt and a soft $Fe_3O_4$ phase. However, the hysteresis loop shows a single-phase like behavior of the $FePt/Fe_3O_4$ nanoparticle and the intimate contact between the FePt core and $Fe_3O_4$ shell leads to an effective interphase exchange coupling. Controlling the thickness of the soft phase shell and composition may lead to increased ductility and deformation during warm compaction.

Figure 11A:
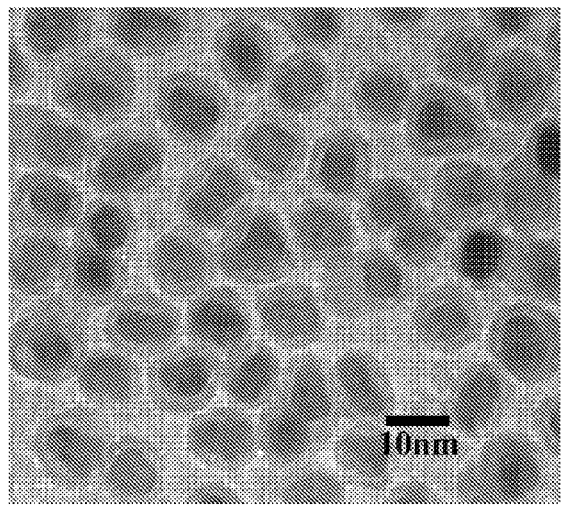
FIG. 11A is a TEM image of the FePt/FeCo core/shell nanoparticle.
Figure 11B:
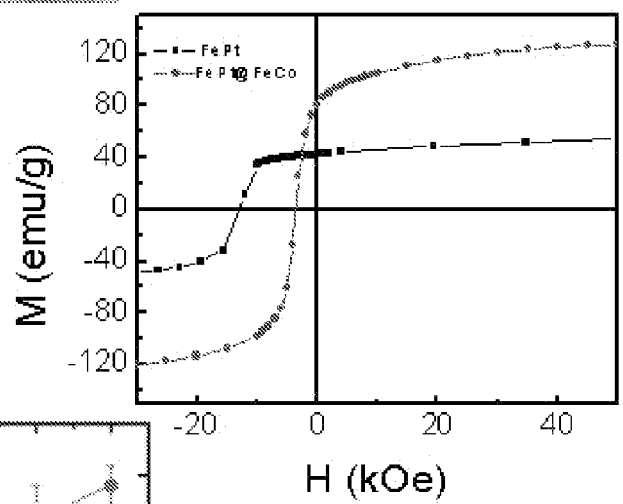
FIG. 11B is a graph of the hysteresis loops of the FePt nanoparticle seeds and annealed FePt/FeCo nanoparticle.

FePt/FeCo nanoparticles are obtained with FePt nanoparticle seeds with $Co(acac)_2/Fe(acac)_3$/polyol precursors in phenyl ether in the presence of 1,2-hexadecanediol, oleic acid, and oleylamine, purging the mixture with argon for 30 min at room temperature and heating to 100° C. for 20 min. and then to 300° C. for 90 min., refluxed, and cooled to room temperature. The black product is precipitated by addition of 20 mL of ethanol and separated via centrifugation. The product is washed two or three times using a mixture of hexane (10 mL) and ethanol (40 mL) and separated via centrifugation. Finally, the product, FePt/FeCo nanoparticles is redispersed in hexane. The hexane dispersion of the bricklike nanoparticles is dropped onto a carbon-coated copper grid for use in transmission electron microscopy ("TEM"). The copper grid is placed in an alumina boat on a silica substrate. The boat is then placed in a heating furnace and purged with a gas mixture (93% Ar+7% $H_2$) for 20 min. The samples are heated to the desired annealing temperatures under a continuous flow of the gas mixture. XRD analysis of the samples annealed at 500° C. show that the phase transformation of FePt from chemically disordered fcc to ordered $L1_0$ begun with the appearance of FePt $L1_0$ superlattice peaks. In FIG. 11A, a TEM of the FePt/FeCo nanoparticle is shown. The room temperature hysteresis loops of the FePt/FeCo nanoparticles is in contrast to the as-synthesized FePt hysteresis loops, as shown in FIG. 11B. The hysteresis loop of the FePt/FeCo nanoparticle shows smooth "single-phase" demagnetization behavior in second quadrant with a high remanence ratio ($M_r/M_s$), which exemplifies exchange-coupled nanocomposite magnet because of interphase exchange coupling between the hard and soft phases.

A typical procedure for obtaining $FePt/CoFe_2O_4$ bricklike nanoparticles having 8 nm FePt and 8 nm $CoFe_2O_4$ is the following: $Co(acac)_2$ (0.05 mmol), $Fe(acac)_3$ (0.1 mmol), 1,2-hexadecanediol (10 mmol), oleic acid (10 mmol), and oleylamine (10 mmol) are mixed in 20 mL of phenyl ether and magnetically stirred under an argon atmosphere, and 90 mg of 8 nm FePt seeds (dry powder) is added to the reaction mixture. After the mixture is purged with argon for 30 min at room temperature, it is heated to 100° C. for 20 min and then to 200° C. for 60 min., refluxed at 265° C. for 30 min., and finally cooled to room temperature. The black product is precipitated by addition of 20 mL of ethanol and separated via centrifugation. The product is washed two or three times using a mixture of hexane (10 mL) and ethanol (40 mL) and separated via centrifugation. Finally, the product, 8 nm FePt/8 nm $CoFe_2O_4$ bricklike nanoparticles, is redispersed in hexane. The structure of the nanoparticle assemblies is examined by transmission electron microscopy ("TEM"), electron diffraction, and x-ray diffraction ("XRD"). The magnetic properties are measured by a superconducting quantum interference device magnetometer.

Alternatively, the magnetic nanoparticles may also be synthesized by physical vapor deposition, chemical vapor deposition, reactive precipitation, sol-gel, microemulsions, sonochemical processing, supercritical chemical processing, magnetron sputtering and other methods known in the arts to give magnetic nanoparticles specific magnetic characteristics or microstructures. FePt nanoparticles are commonly fabricated using vacuum-deposition techniques. As deposited, the FePt has a chemically disordered fcc structure and is magnetically soft. Thermal annealing is needed to transform the fcc structure into the chemically ordered fct structure. However, the annealing also results in nanoparticle aggregation, leading to wide size distributions. To control the size and narrow the size distribution, FePt nanoparticles prepared from vacuum-deposition methods are often buried in a variety of insulator matrices, such as SiO, $Al_2O_3$, $B_2O_3$, or $Si_3N_4$. Alternatively, FePt particles can be made by gas-phase evaporation. Although the average size of these particles can be better controlled in the improved syntheses, it is still difficult to disperse them in various liquid media and to use them to form regular arrays. In contrast with all the physical deposition processes, solution-phase synthesis offers a unique way for producing monodisperse nanoparticles, and has been found to be particularly effective in synthesizing monodisperse FePt nanoparticles and nanoparticle super-lattices. Water-in-oil ("W/O") microemulsions use fine microdroplets of the aqueous phase and are trapped within the assemblies of surfactant molecules dispersed in a continuous oil phase. The surfactant-stabilized microcavities provide confinement that limits nanoparticle nucleation, growth, and agglomeration. Sonochemical processing the acoustic cavitation, that is, the formation, growth, and implosive collapse of a bubble in an irradiated liquid, generates a transient localized hot spot, with an effective temperature of 5000K and a nanosecond lifetime. The cavitation is a quenching process, and hence the composition of the particles formed is identical to the composition of the vapor in the bubbles, without phase separation. High Power Impulse Magnetron Sputtering ("HIPIMS"), also known as High Impact Power Magnetron Sputtering and High Power Pulsed Magnetron Sputtering, ("HPPMS")) is a method for physical vapor deposition of thin films which is based on magnetron sputter deposition. HIPIMS utilizes extremely high power densities of the order of kWcm-2 in short pulses (impulses) of tens of microseconds at low duty cycle (on/off time ratio) of <10%.

EXAMPLES

The following examples are put forth so as to provide those of ordinary skill in the art with a complete disclosure and description of how the compositions, systems, and/or methods claimed herein are made and evaluated, and are intended to be purely exemplary and are not intended to limit the scope of compositions, systems, and/or methods. Efforts have been made to ensure accuracy with respect to numbers (e.g., amounts, temperature, etc.), but some errors and deviations should be accounted for.

Example 1: FePt and $Fe_3O_4$ Bulk Nanocomposite

The FePt with face-centered cubic ("fcc") structure and $Fe_3O_4$ nanoparticles are mixed at a mass ratio of 8:1 in a solution before centrifugation, as disclosed in Rong et al. "Bulk FePt-based nanocomposite magnets with enhanced exchange coupling", J. Applied Physics, 101: 023908, (2007), herein incorporated by reference. The dried nanoparticles are heated before compacting under an Argon atmosphere at 350° C. for 1 hr. to remove surfactants. The powders are then compacted with a warm-compaction press under pressure of 0.5 to 6 GPa for a period of time and at a temperature. In one embodiment, the pressure is 2.5 or 3.8 GPa for 10 min. at temperatures ranging from room temperature (about 20° C.) to 600° C. The obtained bulk samples have dimensions ϕ6 mm×1.5 mm and ϕ3 mm×1.2 mm for the compaction pressures of 2.5 and 3.8 GPa, respectively. For comparison, 15 nm $L1_0$ FePt nanoparticles prepared by the salt-matrix annealing technique were compacted at 2.5 GPa pressure. The Archimedes method is employed for measurements of bulk sample density. The morphology and crystalline structure are characterized by scanning electron microscopy ("SEM"), transmission electron microscopy TEM, and x-ray diffraction XRD using Cu $K_\alpha$. radiation. The composition of the compacted samples are checked by energy dispersive x-ray ("EDX") analysis in SEM. Magnetic properties are measured with superconducting quantum interference device magnetometer with a maximum applied field of 70 kOe. For the ideal FePt/Fe composite, (BH)max=90 MGOe.

Density

The bulk samples density $\rho_p$ is dependent on the compaction temperature ("$T_{cp}$") under different pressures. The density increases monotonously with compaction temperature for both fcc and $L1_0$ nanoparticle compacts. The samples prepared at pressure 3.8 GPa and $T_{cp}$ of 600° C. has the highest density (13.8 g/cm$^3$) which is about 95% of the full density value (14.5 g/cm$^3$ for the FePt/$Fe_3Pt$ composite with 15% volume fraction of $Fe_3Pt$ phase). Such a high density is a result of a significant plastic deformation of the nanoparticles at the applied high pressure. A linear increase in the density can be observed for the $L1_0$ particles in the whole studied temperature range and for the fcc particles in the temperature range from 20 to about 400° C. This may be explained by the fact that the yield strength of metallic FePt materials decreases linearly with temperature in the region between 20 and 800° C. and an effective lubrication mechanism can occur in the heated powders. However, this linear increase in density did not lead to full densification, even when extrapolating the curve to a high temperature.

Figure 12:
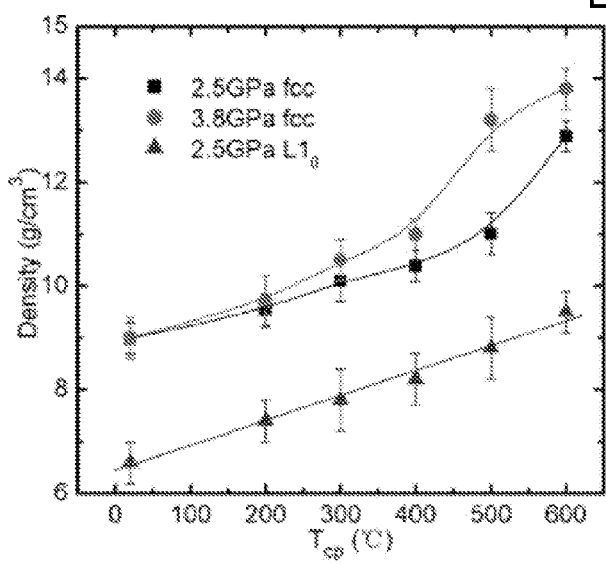
FIG. 12 is a graph of the dependence of density of the bulk samples on compaction temperature $T_{cp}$.

As shown in FIG. 12, for the fcc nanoparticles, the dependence of $\rho_p$ on $T_{cp}$ became steeper when $T_{cp}$≥400° C. This nonlinear behavior may be related to the phase transition from the disordered fcc to the $L1_0$ ordered structure during which atoms are activated and become more mobile. The enhanced atomic diffusion promoted densification of the compacts and results in high density. On the other hand, the phase transition may also accelerate the formation of FePt phase in the FePt—$Fe_3O_4$ nanoparticle system. Approximately 15% volume fraction of $Fe_3Pt$ phase is determined by using the method of Rietveld refinement of the XRD pattern, which is characterization of crystalline materials by the neutron and x-ray diffraction of powder samples resulting in a pattern characterized by peaks in intensity at certain positions.

SEM analysis is performed on the fracture surfaces of the compacts to characterize morphological changes in the compacted samples. Typical SEM images of the bulk samples compacted at 20, 400, and 600° C. are shown in FIGS. 13A-13C respectively. The 20° C.-compacted samples are quite porous. With increasing $T_{cp}$ to 400° C., stripes with thickness around 10-20 μm are formed. However, some small holes are still found in the layers. Compacting at 600° C. led to very large and homogenous areas (>150 μm) in the bulk nanocomposite and thus the high density. The SEM morphology change is consistent with the dependence of density on the compacted temperature.

Phase Transition

The rapidly increased density at the compaction temperature higher than 400° C. may be related to the phase transition of FePt component from fcc structure to the $L1_0$ structure. XRD measurement of the 20, 400, and 600° C.-compacted samples and the patterns are performed to study the phase transition, as shown in FIG. 14. The 20° C.-compact mainly consists of fcc FePt and $Fe_3O_4$ phases. The compaction at 400° C. led to the phase transition of FePt component from fcc to $L1_0$ structure while $Fe_3O_4$ still exists. With increasing $T_{cp}$ to 600° C., the FePt phase is of $L1_0$ structure and the $Fe_3O_4$ disappeared. The quantitative analysis of the phase content can be made approximately by using the method of the Rietveld refinement on XRD patterns. The SEM/EDX analysis shows the decrease of oxygen content from 13.7% for the 20° C.-compacted sample to 5.0% for the 600° c.-compacted sample based on big regions. Especially, the oxygen content decreases fast when $T_{cp} \geq 400°$ C., which implies that the nanocrystalline $Fe_3O_4$ decomposed during the compaction at a temperature much lower than that reported. The TEM/EDX analysis based on small regions confirms the existence $Fe_3Pt$ grains in the 600° C.-compacted samples. The real cause for the decomposition of $Fe_3O_4$ may be related to the activated atoms diffusion during the phase transition of FePt component.

The degree of phase transition from the disordered fcc to the ordered $L1_0$ structure is evaluated in a quantitative way, with the chemical ordering parameter S calculated by $S \approx 0.85 \ [I_{001}/I_{002}]^{1/2}$ for the compacts and starting powders, where $I_{001}$ and $I_{002}$ are the integrated intensity of (001) and (002) XRD peaks of the $L1_0$-FePt phase, respectively. As shown in FIG. 15, the dependence of S on the compaction temperature shows clearly that S is almost zero when $T_{cp} \leq 300°$ C. while it jumped to 0.9 at 400° C., indicating that the phase transition from fcc to $L1_0$ is almost completed for the 400° C.-compacted samples. For comparison, the dependence of S on the annealing temperature of the starting powders is also given, where the annealing time is 10 min, which is same as the compacting time, as shown in FIG. 15. The phase transition took place at a temperature (≤400° C.) in the compacts lower than the powders and that reported for the FePt thin films (usually around 600° C.). The presence of pressure should be responsible for the phase transition temperature shift. The expedited phase transition under high pressure is likely associated with the fact that the phase transition can be described as a compression of the fcc structure in the direction of the c-axis of the resulted tetragonal phase of the $L1_0$ nanoparticle.

The phase transition is also confirmed by the dependence of magnetic properties on $T_{cp}$. As shown in FIG. 16, the dependence of saturation magnetization $M_s$ (measured in an applied field of 7 T) and coercivity $H_C$ on $T_{cp}$. The samples compacted at relatively low temperatures ($T_{cp}$<400° C.) show nearly zero coercivity, while the 400° C.-compacted sample gave $H_C$ of 10 kOe. The drastic increase in coercivity originated from the formation of the $L1_0$ phase with high magnetocrystalline anisotropy. Since a higher $T_{cp}$ led to a higher density of the compacts and thus a reduced surface effect, the $M_s$ value is increased from 850 to 970 emu/cm³ with increasing $T_{cp}$ from 20 to 300° C. However, the $M_s$ dropped to 800 emu/cm³ at $T_{cp}$=400° C., which can be attributed to the phase transition since the anti-parallel alignment of the polarized Pt spins to the Fe spins in the $L1_0$ ordered FePt alloys and thus $M_s$ of the $L1_0$ phase is lower than that of the fcc phase. Considering the $FePt/Fe_3O_4$ mass ratio of 8:1 in the samples, the decrease of $M_s$ should be 23% if the fcc phase is completely transferred to the $L1_0$ phase, which is in good agreement with the observed result. The further increase of $T_{cp}$ results in a fast increase of $M_s$, due to the decomposition of magnetite and the formation of $Fe_3Pt$ phase during the compaction at relatively high temperature. The mass ratio of $FePt/Fe_3O_4$ may be altered.

Microstructural Characteristics

X-ray diffraction line-broadening analysis is performed on the bulks to quantitatively determine the effect of warm compaction on the microstructure. As shown in FIGS. 17A-17B, the grain size and retained strain are then determined using the Williamson-Hall analysis method. As shown in FIG. 17A, the grain size is almost unchanged (around 7 nm) with temperature when $T_{cp} \leq 300°$ C. However, the grain size increased linearly after that to 22 nm when $T_{cp}$=600° C. The pressure has little effect on the grain size; however, the phase transition promoted grain growth which can be seen from the abrupt increase in grain size after the temperature is higher than 400° C. The grain size is still under control in the nanoscale and a higher pressure led to a higher microstrain in the compacts and the microstrain is reduced with increasing temperature. As shown in FIG. 17B, when the temperature is increased to $T_{cp} \geq 400°$ C., the microstrain is reduced quickly, since the atomic rearrangement and atomic diffusion during the phase transition released the strain in the samples.

Figure 18C:
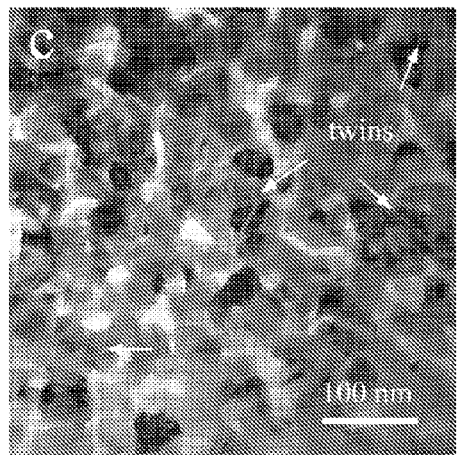
Figure 18D:
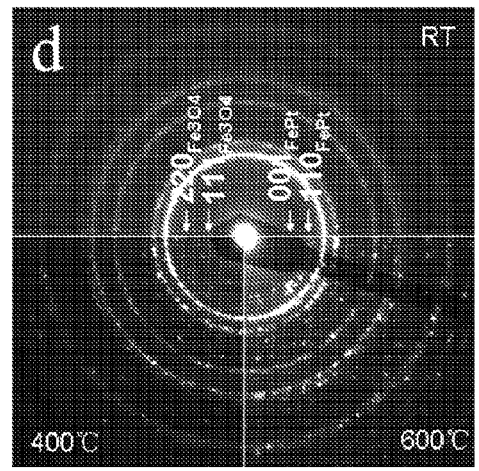

As shown in FIGS. 17A-17B, the grain size of bulk samples with the post-annealing step (compacted under 2.5 GPa and post-annealed in forming gas at 500° C. for 1 hr.) illustrated the effect of heat treatment on the morphology. The annealing led to the grain growth from 6.5 to 16 nm for the 20° C.-compacted sample, while only from 22 to 25 nm for the 600° C.-compacted sample, implying that the phase transition is the main reason for the grain growth. This is also evidenced by the observation that grain size of the $L1_0$ nanoparticles is almost unchanged during the annealing. The compacts made by the 15 nm $L1_0$ nanoparticles show no grain growth up to 600° C. To confirm, the samples are heated to 1000° C. for 1 hour and the average grain size is just slightly increased to about 17 nm. The high stability of the $L1_0$ structured nanoparticles can be utilized for fabrication of bulk nanocomposite magnets with very fine and homogenous nanoscale morphology As shown in FIGS. 18A-18C, the bright field TEM images of the bulk samples prepared from fcc nanoparticles under 2.5 GPa pressure at 20, 400, and 600° C., respectively. As shown in FIG. 18D, the selected area electron diffraction patterns confirm the phase transition. The TEM images show that grain size increases with $T_{cp}$. The grain size is about 7±3 nm and 14±5 nm for the 20 and 400° C.-compacted samples, respectively shown in FIGS. 18A and 18B. The grain size and size distribution are quite small compared to those for bulk materials fabricated by traditional techniques. The average grain size depends on the compacting temperature. For the 600° C.-compacted samples, as shown in FIG. 18C, TEM image shows the grain size is about 30±10 nm, which is larger than that of XRD analysis, which is attributed to the existence of large number of twin grains, as indicated by white arrows.

Exchange Coupling and Magnetic Properties

Figure 19A:
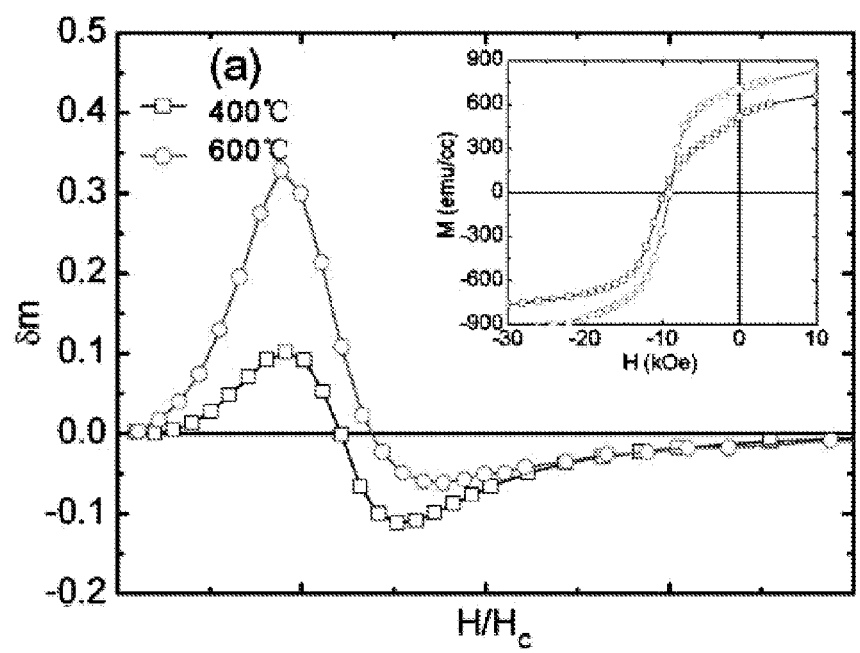
FIG. 19A is a graph of $\delta m$ plots of the samples compacted 400 and 600° C. from the fcc nanoparticles, and the inset of FIG. 19A is a graph of the respective hysteresis loops of the samples compacted at 400 and 600° C.

Controlling the grain size of the compacts realizes inter-grain magnetic exchange coupling and achieves high energy products. The $\delta m = m_d(H) - (1 - 2m_r(H))$ measurements (Henkel plots) is performed to study the magnetic interactions in the warm compaction-produced nanocomposite magnets. Here $m_d$ is demagnetization remanence and $m_r$ is isothermal magnetization remanence. Both of these values are normalized by the saturation remanence. Nonzero δm is caused by magnetic interactions between particles or grains. The positive δm is interpreted as a sign for magnetic exchange coupling and the negative δm is a sign of magnetic dipolar interaction. As shown in FIG. 19A, the δm value for the 600° C.-compacted sample is positive and much higher than that for the 400° C.-compacted sample, indicating stronger exchange coupling in the compact compared to the 400° C.-compacted samples with lower density. This is also reflected by the shape of the hysteresis loops, as shown in the inset of FIG. 19A. The remanence ratio ($M_r/M_s=0.63$, where $M_r$, is the remanent magnetization) of the 600° C.-compacted sample is higher than that of the 400° C. compacted ($M_r/M_s=0.58$), which is also consistent with the δm measurement. This effect is even more pronounced for the L1$_0$ nanoparticle samples, as shown in FIG. 19B, where the Henkel plots for 15 nm L1$_0$ nanoparticles and their compacts. δm for them before compaction is a large negative value. After the compaction at 2.5 GPa and 200° C., δm changed its sign to positive, indicating an inter-particle exchange interaction. Annealing of the compact at 1000° C. for 1 hr. led to further increase in δm value, which is an enhancement of the exchange coupling. As the annealing causes almost no obvious grain growth, the strong increase in δm can be attributed to improvement in interface conditions upon the high temperature annealing. The hysteresis loops of the L1$_0$ nanoparticles is shown in the inset in FIG. 19B and its compacts shows that the enhanced exchange coupling significantly improves the squareness of the hysteresis loops and therefore the energy products. A $(BH)_{max}$ of about 15.6 MG Oe has been obtained based on the measurement from the real density.

Figure 20C:
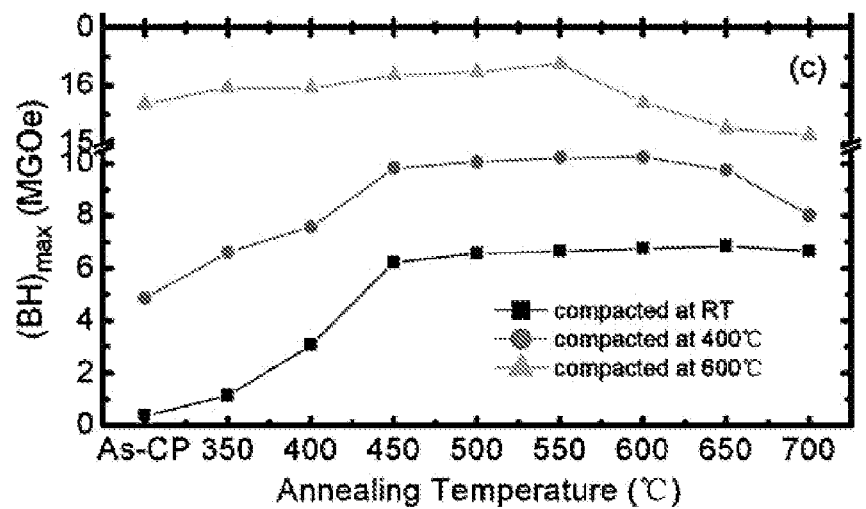

The magnetic properties can be further improved by a post-annealing under forming gas (93% Ar+7% H$_2$) for 1 hr. The effect of annealing temperature ("$T_a$") on $M_s$, $H_c$, and $(BH)_{max}$ of the 20, 400, and 600° C. compacts, is shown in FIGS. 20A-20C, respectively. As shown in FIG. 20A, the $M_s$ of the 20 and 400° C. compacts increased significantly after the annealing, due to the decomposition of Fe$_3$O$_4$ phase and the formation of Fe or Fe$_3$Pt with high magnetization in the reducing atmosphere. The $M_s$ value up to 1140 emu/cm$^3$ can be obtained by post-annealing. However, the $M_s$ of the 600° C.-compacted sample has a very small change upon post-annealing, which may be due to the early formation of Fe$_3$Pt phase during the warm compaction. For all the samples compacted at the three temperatures, high-temperature annealing (>600° C.) led to a decrease in $M_s$, which may be related to the atomic diffusion between FePt and Fe$_3$Pt. As shown in FIG. 20B, the IL of the 20° C.-compacted samples increases fast when $T_a$ is higher than 450° C. which shows that the phase transition from fcc to L1$_0$ results in magnetic hardening. For the 400 and 600° C.-compacted samples, post-annealing did not improve the $H_c$ since the phase transition have already happened during the warm compaction. In this case, high-temperature annealing led to an overgrowth in grain size and therefore deterioration in the magnetic properties. As shown in FIG. 20C, the $(BH)_{max}$ is up to 16.3 MG Oe, so by optimizing the post-annealing parameters further improvement of the $(BH)_{max}$ up to 16.3 MG Oe (based on the real density for 600° C. compact). This $(BH)_{max}$ is significantly higher than the theoretical limit (13 MG Oe) for the single phase isotropic FePt magnets.

Example 2: SmCo$_5$/Fe NdFeB and SmCo/Fe Bulk Nanocomposites

Figure 21:
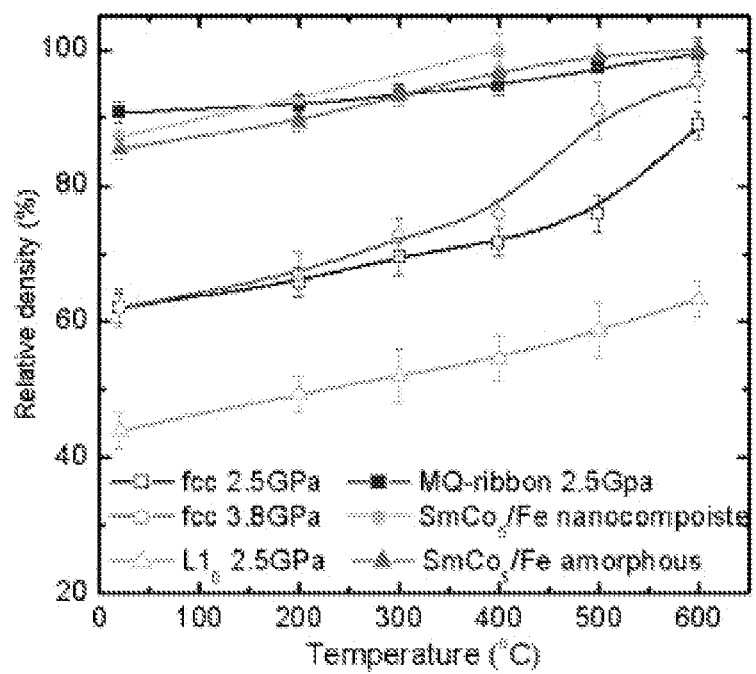
FIG. 21 is a graph showing the comparison of the dependence of density on the compaction temperature for (a) fcc FePt nanoparticle under 2.5 GPa; (b) fcc FePt nanoparticles under 3.8 GPa; (c) $L1_0$ FePt nanoparticles; (d) MQ-15-7 ribbons; (e) crystallized SmCo5/Fe nanocomposite powders; (f) amorphous SmCo/Fe powders.

FIG. 21 shows the comparison of the dependence of density on the compaction temperature for (a) fcc FePt nanoparticles under 2.5 GPa; (b) fcc FePt nanoparticles under 3.8 GPa; (c) L1$_0$ FePt nanoparticles; (d) MQ-ribbons; (e) crystallized SmCo$_5$/Fe nanocomposite powders; (f) amorphous SmCo/Fe powders. MQ-ribbons are NdFeB ribbons obtained by rapid quench plus a crushing process. NdFeB ribbons are compacted at different temperatures under 2.5 GPa. The size of the compacts is about φ=6 mm and h=2 mm. The density can reach 100% at 500-600° C., as shown in FIG. 21. The XRD patterns of the starting ribbons and 500° C.-compacted samples that are quite similar. However, the change of grain size may be determined by a very sensitive XRD machine. Hysteresis loops are also similar for different compaction temperatures. For the ideal SmCo/Fe composite, (BH)max=65 MGOe. For the ideal Sm$_2$Fe$_{17}$N$_x$.FeCo composite, (BH)max=120 MGOe.

Figure 22A:
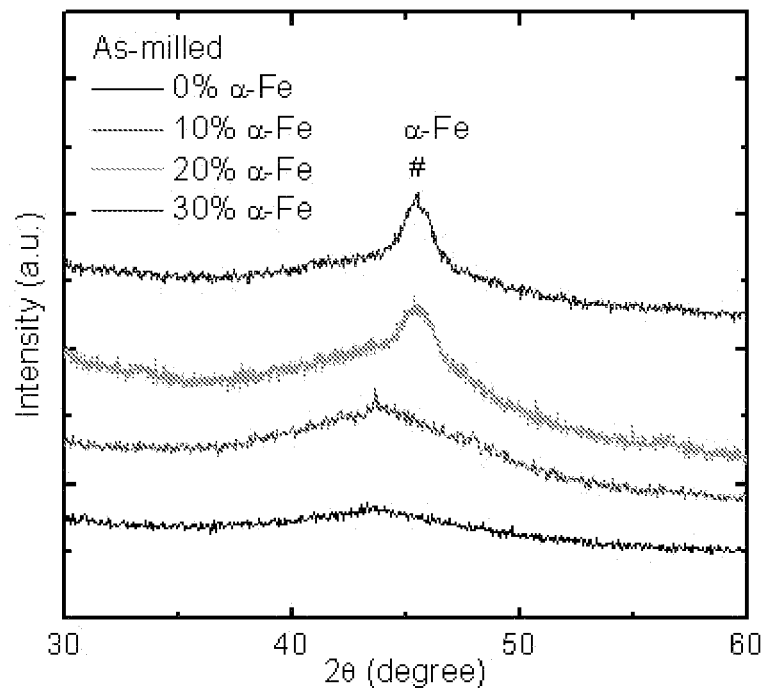
FIG. 22A is a graph of as-milled powders is SmCo amorphous and very fine Fe nanocrystalline and FIG. 22B is a graph of annealed powders is SmCo5+α-Fe nanocomposite.
Figure 22B:
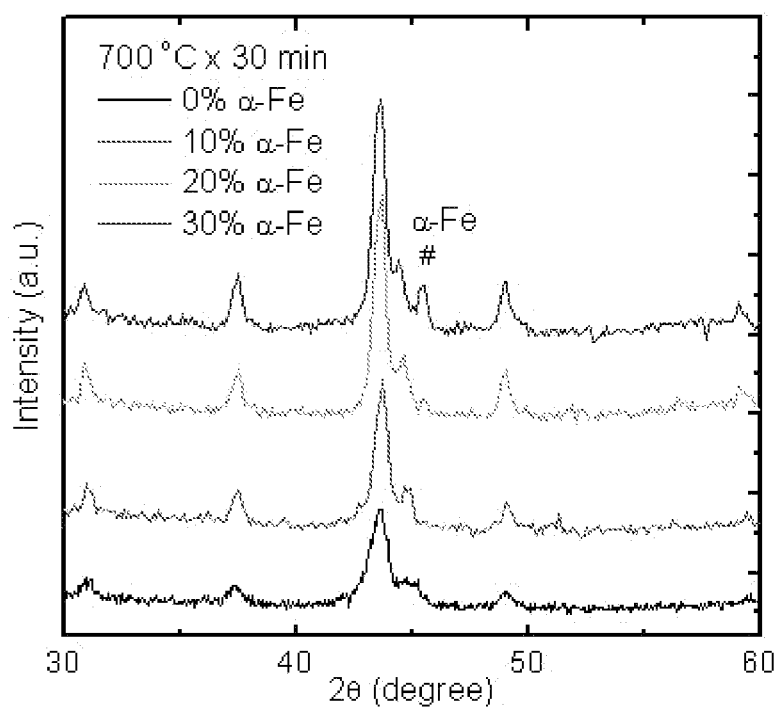
Figure 24:
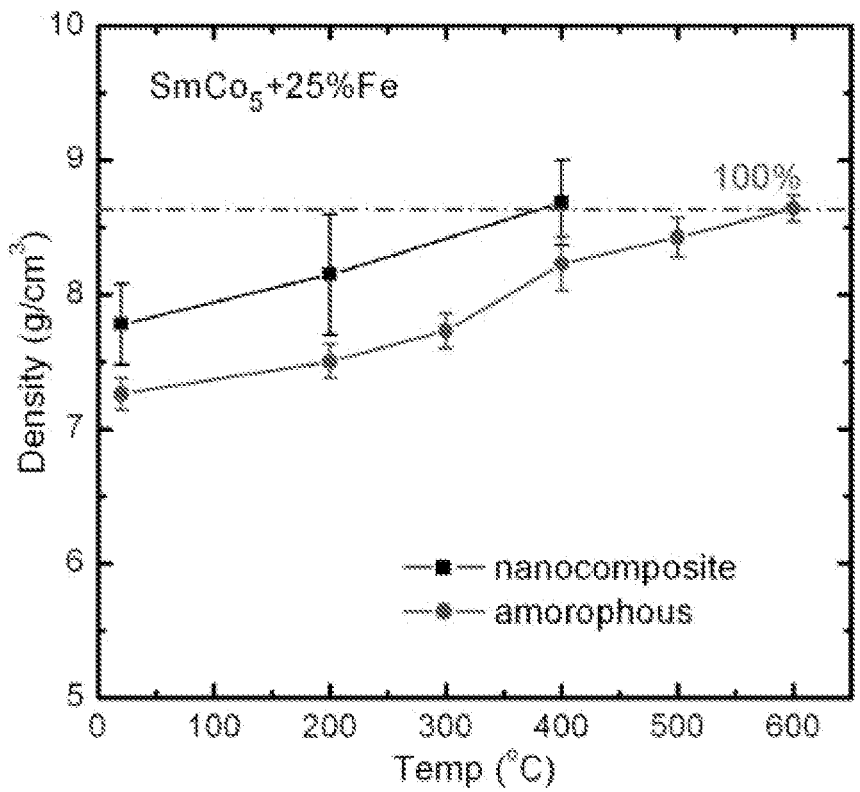
FIG. 24 is a graph of the density of the SmCo/Fe samples compared with the annealing temperature, where FIGS. 23A-23F correspond to the amorphous red curve.

FIG. 22A is a graph of the XRD patterns of as-milled powders of SmCo amorphous and very fine Fe nanocrystals. FIG. 22B is a graph of the XRD patterns of annealed powder of SmCo$_5$+α-Fe nanocomposite warm compacted at 700° C. for 30 min.

FIGS. 23A-23F are SEM images of the surface of the bulk SmCo/Fe samples compacted from the amorphous powders at different temperatures, room temperature, 200° C., 300° C., 400° C., 500° C., and 600° C., respectively. As shown in FIG. 24, FIGS. 23A-23F SEM images correspond to the amorphous red curve, indicating that density increases with compaction density. Optionally, the SmCo/Fe samples may be post annealed under a forming gas (93% Ar+7% H$_2$) for 1 hr.

Figure 25A:
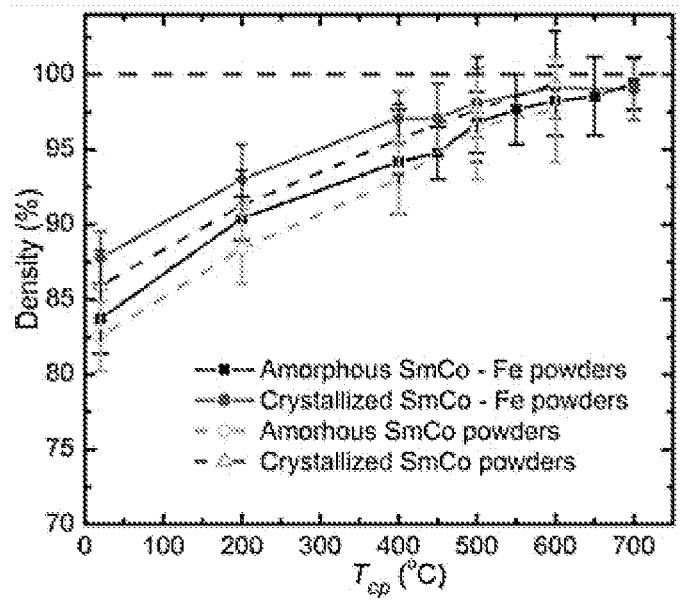
FIG. 25A is a graph of he dependence of density on compaction temperature for amorphous SmCo—Fe powders, crystallized SmCo—Fe powders, amorphous SmCo powders, and crystallized SmCo powders.
Figure 25B:
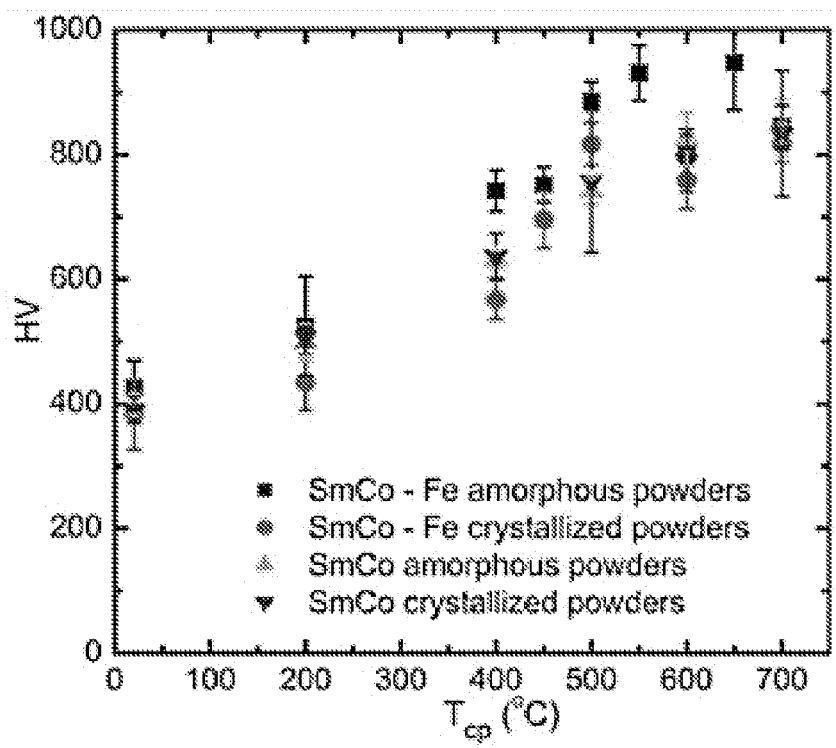
FIG. 25B is a graph of the Vicker hardness ("HV") dependence on compaction temperature for SmCo—Fe amorphous powders, SmCo—Fe crystallized Fe powders, SmCo amorphous powders, and SmCo crystallized powders.
Figure 26A:
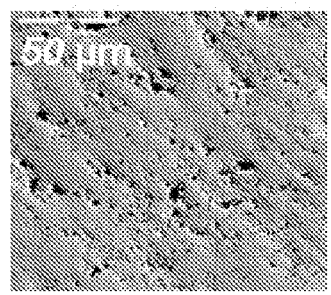
FIG. 26A-D are SEM images of 20° C., 200° C., 400° C. and 600° C., respectively, for compacted bulk nanocomposite $SmCo_5$/Fe from crystallized powders.
Figure 26B:
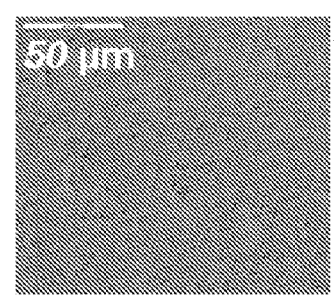
Figure 26C:
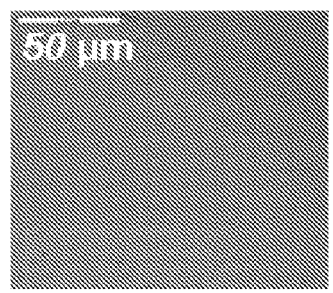
Figure 26D:
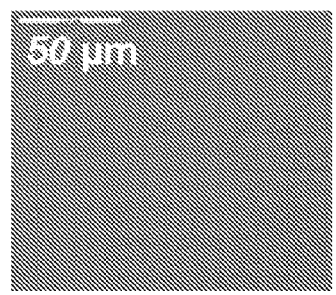

Alternatively, the SmCo/Fe bulk magnets are processed by ball milling of the SmCo and Fe powders into nanocomposites and warm compacting the nanocomposite powder particles to form 6-9 mm samples at 3.5 GPa at <600° C., where the grain size is in low nanoscale region. FIG. 25A shows the dependence of density on compaction temperature for amorphous SmCo—Fe powders, crystallized SmCo—Fe powders, amorphous SmCo powders, and crystallized SmCo powders. FIG. 25B shows the Vicker hardness (HV) dependence on compaction temperature for SmCo—Fe amorphous powders, SmCo—Fe crystallized Fe powders, SmCo amorphous powders, and SmCo crystallized powders. Amorphous powders are a solid in which there is no long-range order of the positions of the atoms. Crystallized or crystalline powders are solids in which there is long-range atomic order.

FIG. 26A-D are SEM images of 20° C., 200° C., 400° C. and 600° C., respectively, for compacted bulk nanocomposite SmCo$_5$/Fe from crystallized powders.

Figures 27A, 27B:
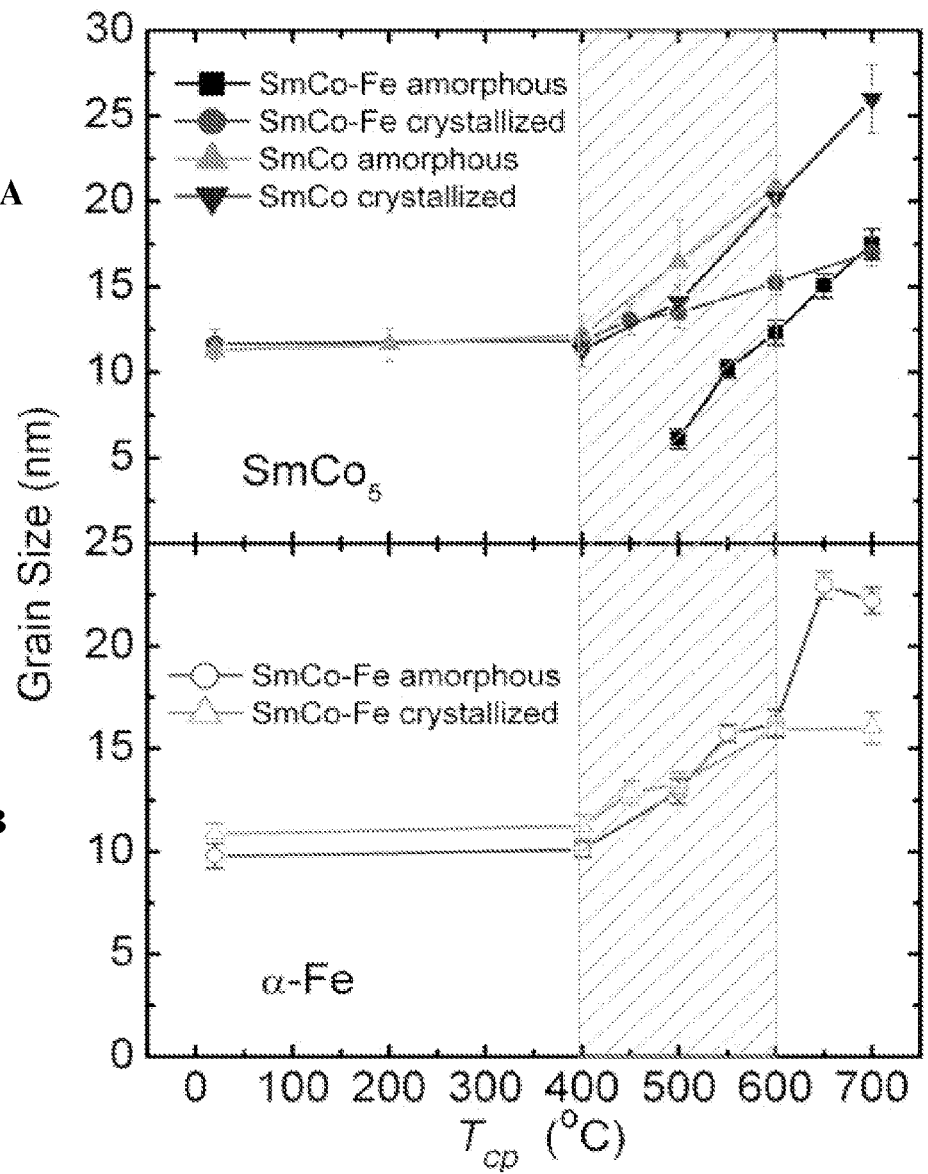
FIG. 27A is a graph of the dependence of grain size of $SmCo_5$ on the compaction temperature measured from XRD patterns for SmCo—Fe amorphous powders, SmCo—Fe crystallized Fe powders, SmCo amorphous powders, and SmCo crystallized powders.
FIG. 27B is a graph of the dependence of grain size of and α-Fe grains for SmCo—Fe amorphous powders and SmCo—Fe crystallized Fe powders.
Figure 28A:
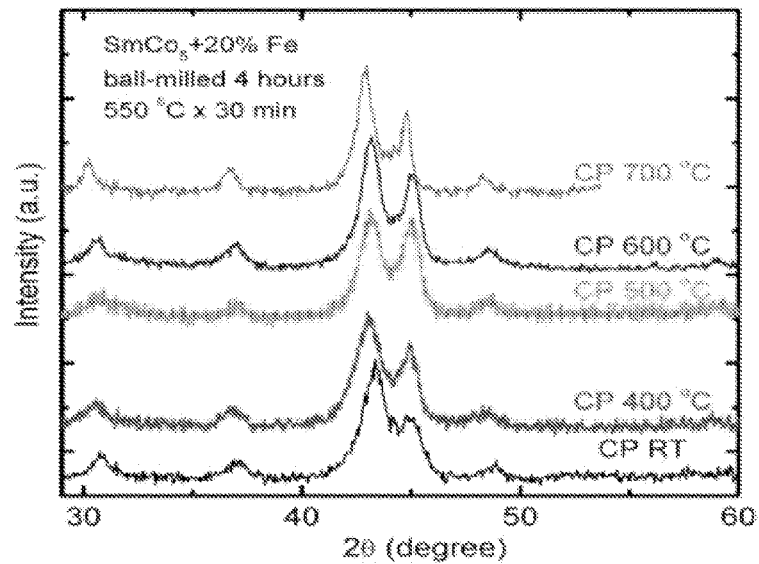
FIG. 28A is a graph of the XRD patterns for $SmCo_5$+20% Fe ball-milled for 4 hours and warm compacted at 550° C. for 30 minutes.
Figure 28B:
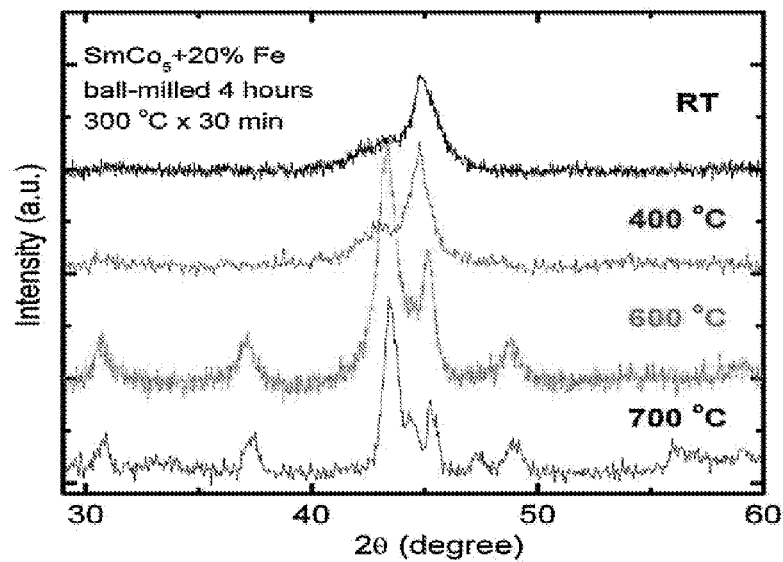
FIG. 28B is a graph of the XRD patterns for $SmCo_5$+20% Fe ball-milled for 4 hours and warm compacted at 300° C. for 30 minutes.

The grain size is in low nanoscale region. FIG. 27A shows the dependence of grain size of SmCo$_5$ on the compaction temperature measured from XRD patterns for SmCo—Fe amorphous powders, SmCo—Fe crystallized Fe powders, SmCo amorphous powders, and SmCo crystallized powders. FIG. 27B shows the dependence of grain size of and α-Fe grains for SmCo—Fe amorphous powders and SmCo—Fe crystallized Fe powders. FIG. 28A shows the XRD patterns for $SmCo_5$+20% Fe ball-milled 4 hours 550° C.×30 minutes. FIG. 28B shows the XRD patterns for $SmCo_5$+20% Fe ball-milled 4 hours 300° C.×30 minutes.

Figure 29A:
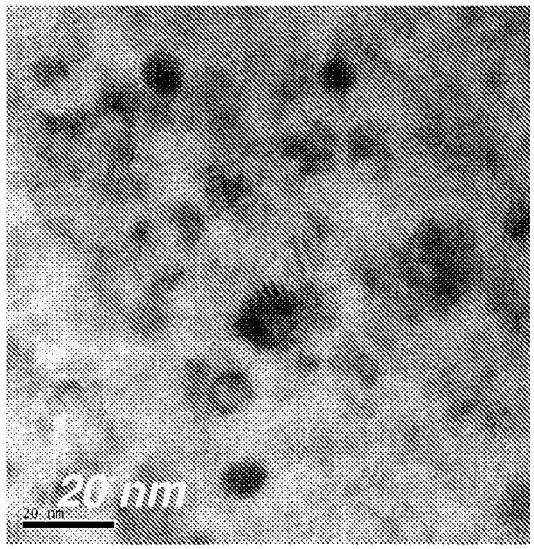
FIGS. 29A-C are TEM images of 400° C., 600° C. and 700° C. compacted bulks from the crystallized nanocomposite $SmCo_5$/Fe powders, respectively.
Figure 29B:
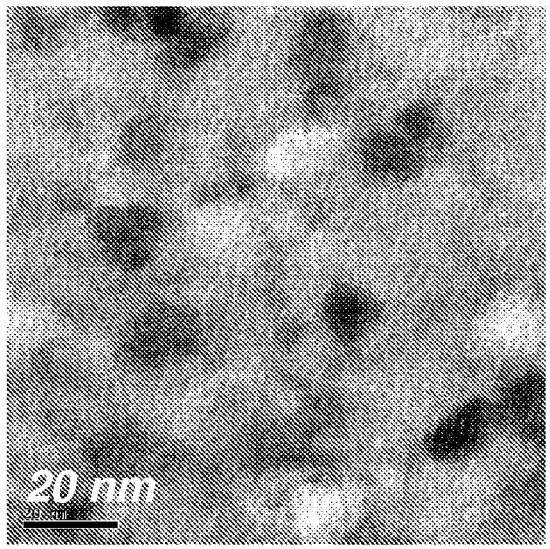
Figure 29C:
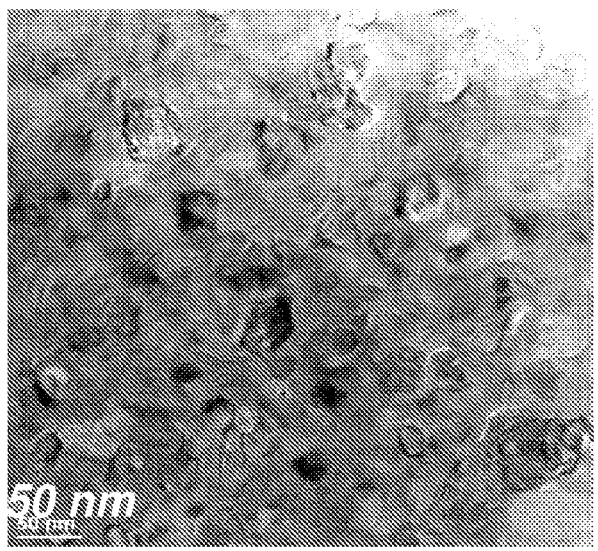

FIGS. 29A-C are TEM images of 400° C., 600° C. and 700° C. compacted bulks from the crystallized nanocomposite $SmCo_5$/Fe powders, respectively. The TEM images show the low nanoscale grain size of the $SmCo_5$/Fe powders, affected by temperature.

Figures 30A, 30B:
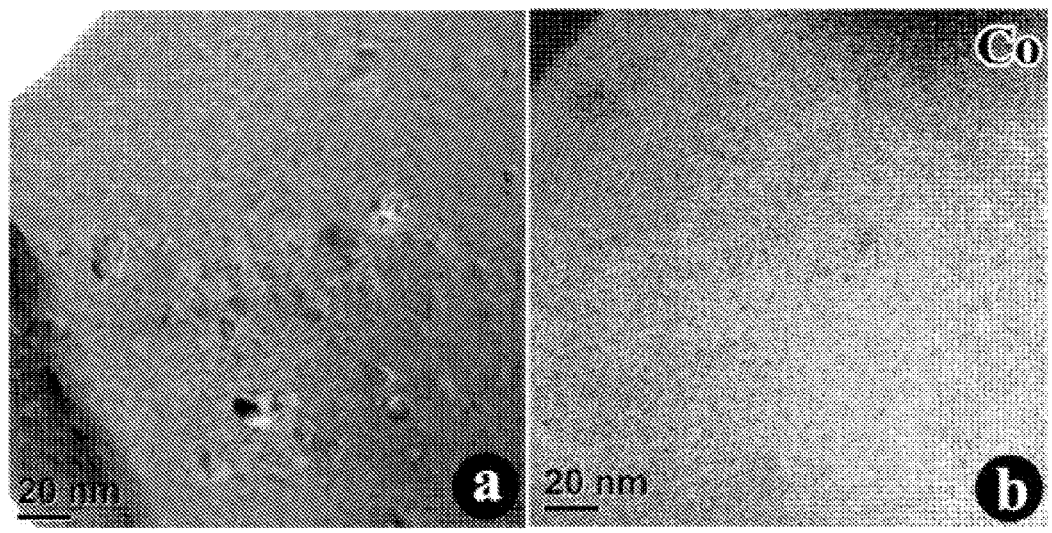
FIG. 30A is an energy filter TEM image of the $SmCo_5$/Fe bulk nanocomposite.
FIG. 30B is an energy filter TEM image showing the element distribution of Co.
Figures 30C, 30D:
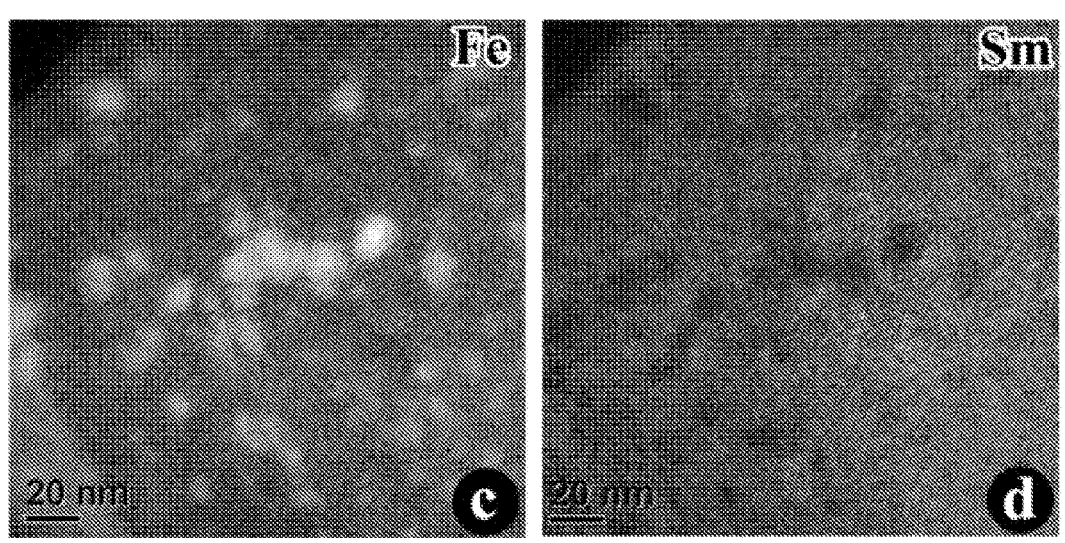
FIG. 30C is a TEM image showing the element distribution of Fe.
FIG. 30D is an TEM image shows the element distribution of Sm.

FIG. 30A is an energy filter TEM image of the $SmCo_5$/Fe bulk nanocomposite, where FIG. 30B shows the element distribution of Co, FIG. 30C shows the element distribution of Fe, and FIG. 30D shows the element distribution of Sm.

Figure 31A:
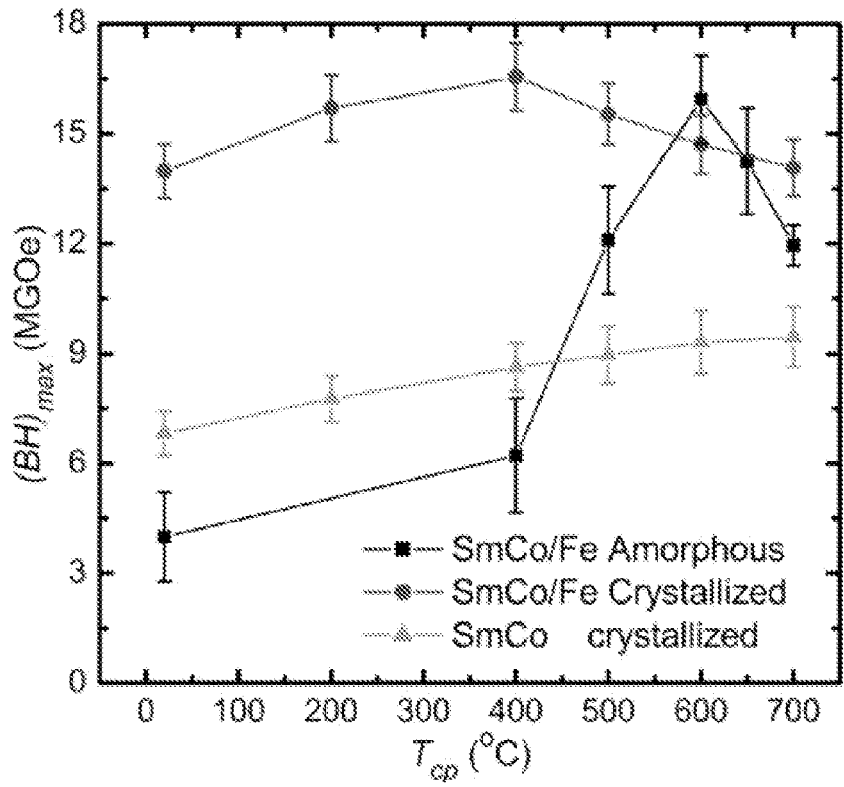
FIG. 31A is a graph of the dependence of $(BH)_{max}$ on $T_{cp}$ of the bulk samples compacted from SmCo/Fe amorphous and SmCo/Fe and SmCo crystallized powders.
Figure 31B:
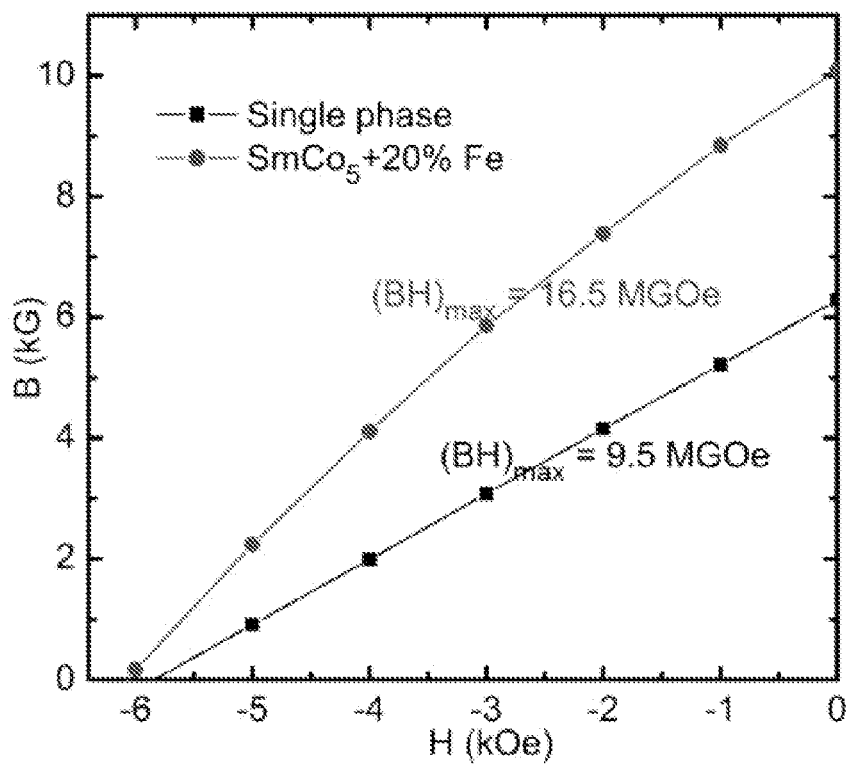
FIG. 31B is a graph of the second-quadrant B—H curves of the bulk nanocomposite and single-phase magnets with maximum energy products of 16.5 MGOe for $SmCo_5$+20% Fe and the single phase counterpart includes 9.5 MGOe energy product.

The $SmCo_5$/Fe bulk magnet performance showed the first exchange-coupled nanocomposite isotropic SmCo/Fe magnets. FIG. 31A is a graph of the dependence of $(BH)_{max}$ on $T_{cp}$ of the bulk samples compacted from amorphous and crystallized powders. FIG. 31B is a graph of the second-quadrant B—H curves of the bulk nanocomposite and single-phase magnets with maximum energy products. The energy product enhancement is greater than 70%, as shown in FIG. 31B the energy product of 16.5 MGOe for $SmCo_5$+ 20% Fe and the single phase counterpart of 9.5 MGOe energy product.

Example 3: Deformation in Nanocrystalline Metals

Nanoparticle deformation mechanism and interface atom diffusion may optimize warm compacting parameters. Utilization of parallel computing programs and Atomistic Computer Simulations may detect increased deformation at and through grain boundaries to increase the bulk nanocomposite produced by the warm compaction method, as disclosed in Swygenhoven et al., "Deformation in Nanocrystalline Metals"; Mats. Today; 9; 5 2006, 24-31, herein incorporated by reference. Increased deformation at and through the grain boundaries will increase the density and the magnetization of the compacts.

Example 4: Naval Applications

The bulk nanocomposite magnets may be used in axial field permanent magnet motor/centrifugal pump to improve reliability in naval applications. Radial field permanent magnet motors have been demonstrated for quiet undersea vehicle propulsion. The bulk nanocomposite magnets may also be used for integrated motor/propulsors in naval machines.

Example 5: Hybrid Cars

Warm compacted bulk nanocomposites may provide energy enhancement for hybrid cars for increased energy efficiency.

Example 6: Wind Energy

Wind energy turbines use permanent magnet generates in the generator's gear box. The bulk nanocomposites may be used in the generator gear box for wind energy turbines.

It will be apparent to those skilled in the art that various modifications and variations can be made in the embodiments disclosed herein without departing from the scope or spirit of the invention. Other embodiments will be apparent to those skilled in the art from consideration of the specification and practice of the embodiments disclosed herein. It is intended that the specification and examples be considered as exemplary only, with a true scope and spirit of the invention being indicated by the following claims.

What is claimed is:

1. A process of forming a plurality of magnetic nanoparticles comprising:
   a. providing a powder with particles of a first size in an inert environment;
   b. dissolving the powder in a first solvent with a surfactant;
   c. ball milling the powder into a plurality of nanoparticles having a second size;
   d. dispersing the nanoparticles into a second solvent; and
   e. separating the nanoparticles by a size selection process.

2. The process of claim 1, wherein the powder is selected from one of FeO, $Fe_2O_3$, $Fe_3O_4$, Co, Fe, Ni, CoFe, NiFe, CoO, NiO, ferrites of formula $MFe_2O_3$ where M is Co or Ni, FePt, CoPt, SmCo-based alloys including $SmCo_5$, $Sm_2Co_{17}$, $Sm_2Co_7$, and $SmCo_7$, and rare earth-FeB-based alloys of formula $R_2Fe_{14}B$ where R is Nd or Pr.

3. The process of claim 2, wherein the powder is a SmCo-based alloy and the ball milling step includes a weight ratio of the powder to ball of about 1:10.

4. The process of claim 1, wherein the separating step comprises spinning the nanoparticles dispersed in the second solvent to obtain a first supernatant and a first slurry and separating the first supernatant from the first slurry to obtain a plurality of nanoparticles with an average size distribution of about 4 to about 10 nm dispersed in the first supernatant.

5. The process of claim 4, further comprising
   a. washing the first slurry with a solvent;
   b. dispersing the washed first slurry in a solvent;
   c. statically settling down the dispersed solution of the washed first slurry for about 2 to about 5 hours;
   d. spinning the settled down solution of the first slurry to obtain a second supernatant and a second slurry; and
   e. separating the second supernatant from the second slurry to obtain a plurality of nanoparticles with an average size of about 10 to about 15 nm.

6. The process of claim 4, further comprising:
   a. washing the first slurry with a solvent;
   b. dispersing the washed first slurry in a solvent;
   c. statically settling down the dispersed solution of the washed first slurry for about 20 to about 30 minutes;
   d. spinning the settled down solution of the first slurry to obtain a second supernatant and a second slurry; and
   e. separating the second supernatant from the second slurry to obtain a plurality of nanoparticles with an average size greater than about 20 nm.

7. The process of claim 1, wherein the first size is 1-45 μm and the second size is up to 50 nm.

8. The process of claim 1, wherein the amount of the surfactant is 8-10% of the weight of the powder.

9. The process of claim 1, wherein the surfactant comprises oleic acid, oleyl amine, erucic acid, and/or linoleic acid.

* * * * *